(12) United States Patent
Konuma et al.

(10) Patent No.: US 10,330,837 B2
(45) Date of Patent: Jun. 25, 2019

(54) NEAR-INFRARED SHIELDING FILM, METHOD FOR PRODUCING THE SAME, AND PRESSURE-SENSITIVE ADHESIVE COMPOSITION

(71) Applicant: Konica Minolta, Inc., Chiyoda-ku, Tokyo (JP)

(72) Inventors: Taro Konuma, Fuchu (JP); Mitsunori Gotou, Saitama (JP); Hiroaki Obata, Kobe (JP)

(73) Assignee: KONICA MINOLTA, INC., Tokyo (JP)

( * ) Notice: Subject to any disclaimer, the term of this patent is extended or adjusted under 35 U.S.C. 154(b) by 66 days.

(21) Appl. No.: 15/562,749

(22) PCT Filed: Mar. 23, 2016

(86) PCT No.: PCT/JP2016/059137
§ 371 (c)(1),
(2) Date: Sep. 28, 2017

(87) PCT Pub. No.: WO2016/158604
PCT Pub. Date: Oct. 6, 2016

(65) Prior Publication Data
US 2018/0081097 A1   Mar. 22, 2018

(30) Foreign Application Priority Data
Mar. 31, 2015 (JP) ................................. 2015-070583

(51) Int. Cl.
*G02B 5/20* (2006.01)
*B32B 7/02* (2019.01)
(Continued)

(52) U.S. Cl.
CPC ................ *G02B 5/208* (2013.01); *B32B 7/02* (2013.01); *B32B 7/12* (2013.01); *B32B 27/08* (2013.01);
(Continued)

(58) Field of Classification Search
CPC ... G02B 5/20–5/208; G02B 1/10–1/119; C09J 7/30–7/387; B32B 7/00–7/09; C08K 3/22
See application file for complete search history.

(56) References Cited

U.S. PATENT DOCUMENTS

| | | | | |
|---|---|---|---|---|
| 5,650,233 A | * | 7/1997 | Miyake | C09D 4/06 428/412 |
| 2009/0279168 A1 | * | 11/2009 | Hiwatashi | C09J 11/06 359/359 |

(Continued)

FOREIGN PATENT DOCUMENTS

| | | |
|---|---|---|
| JP | 2010163574 A | 7/2010 |
| WO | 2008064312 A1 | 5/2008 |

OTHER PUBLICATIONS

International Search Report corresponding to Application No. PCT/JP2016/059137; dated Jun. 28, 2016.

*Primary Examiner* — William R Alexander
*Assistant Examiner* — Jeffrey E Madonna
(74) *Attorney, Agent, or Firm* — Cantor Colburn LLP

(57) ABSTRACT

An object of the present invention is to provide a near-infrared shielding film having low initial haze and resistance to haze increase in weathering tests, to provide a method for producing such a near-infrared shielding film, and to provide a pressure-sensitive adhesive composition.

The near-infrared shielding film of the present invention includes a transparent substrate and a component layer that is provided on at least one surface of the substrate and includes, as compounds, resin A shown below, at least one of resin B or C shown below, and oxide fine particles D shown below.

(Continued)

Resin A: A resin having an acid value of less than 0.5 mgKOH/g and a hydroxy value of 5 to 60 mgKOH/g Resin B: A resin having an acid value of 1 to 60 mgKOH/g Resin C: A resin having an acid value of at least 1 mgKOH/g and a hydroxy value of 5 to 60 mgKOH/g Oxide fine particles D: Tungsten oxide fine particles or composite tungsten oxide fine particles.

8 Claims, 1 Drawing Sheet

(51) Int. Cl.
| | |
|---|---|
| *B32B 27/20* | (2006.01) |
| *C09J 11/04* | (2006.01) |
| *C09J 201/00* | (2006.01) |
| *B32B 7/12* | (2006.01) |
| *B32B 27/08* | (2006.01) |
| *C09J 7/02* | (2006.01) |
| *G02B 5/26* | (2006.01) |
| *C09J 7/00* | (2018.01) |
| *C09J 7/38* | (2018.01) |
| *C08K 3/22* | (2006.01) |
| *G02B 5/22* | (2006.01) |

(52) U.S. Cl.
CPC ............ *B32B 27/20* (2013.01); *C08K 3/22* (2013.01); *C09J 7/00* (2013.01); *C09J 7/0217* (2013.01); *C09J 7/38* (2018.01); *C09J 7/385* (2018.01); *C09J 11/04* (2013.01); *C09J 201/00* (2013.01); *G02B 5/26* (2013.01); *B32B 2307/412* (2013.01); *C08K 2003/2258* (2013.01); *C09J 2201/622* (2013.01); *C09J 2205/102* (2013.01); *C09J 2433/00* (2013.01); *C09J 2467/006* (2013.01); *G02B 5/22* (2013.01)

(56) References Cited

U.S. PATENT DOCUMENTS

| | | | |
|---|---|---|---|
| 2013/0078460 A1* | 3/2013 | Tasaka | C09D 5/1637 428/339 |
| 2013/0213691 A1* | 8/2013 | Park | H01B 3/082 174/126.4 |
| 2014/0335364 A1* | 11/2014 | Fujita | B32B 17/10036 428/437 |
| 2018/0057720 A1* | 3/2018 | Shanai | B32B 7/12 |
| 2018/0164681 A1* | 6/2018 | Kamimura | G03F 7/004 |

* cited by examiner

NEAR-INFRARED SHIELDING FILM, METHOD FOR PRODUCING THE SAME, AND PRESSURE-SENSITIVE ADHESIVE COMPOSITION

CROSS REFERENCE TO RELATED APPLICATIONS

This is the U.S. national stage of application No. PCT/JP2016/059137, filed on Mar. 23, 2016. Priority under 35 U.S.C. § 119(a) and 35 U.S.C. § 365(b) is claimed from Japanese Application No. 2015-070583, filed on Mar. 31, 2015, the disclosures of which are also incorporated herein by reference.

TECHNICAL FIELD

The present invention relates to a near-infrared shielding film, a method for producing the near-infrared shielding film, and a pressure-sensitive adhesive composition. More specifically, the present invention relates to a near-infrared shielding film having low initial haze and resistance to haze increase in weathering tests, to a method for producing such a near-infrared shielding film, and to a pressure-sensitive adhesive composition.

BACKGROUND ART

A heat shield film including a substrate and a hard coat layer formed on at least one surface of the substrate by curing an active energy ray-curable resin composition having the ability to absorb infrared rays (heat rays) (heat shield performance) is proposed as a protective film or a heat shield film for components of displays such as image displays (e.g., liquid crystal displays, CRT displays, plasma displays, electroluminescence (EL) displays), and touch panels, and for window panes of buildings, cars, and trains.

Recently, it has also been proposed to use, as infrared absorbers, composite tungsten oxide fine particles with high heat shield performance (e.g., refer to Patent Literatures 1 and 2).

Patent Literature 1 discloses a technology in which adhesion, reworkability, and suppression of chromaticity change caused by spectral characteristics change in a high-temperature, high-humidity environment at 60° C. and 90% RH can be achieved using composite tungsten oxide fine particles and an acrylic pressure-sensitive adhesive resin containing carboxy groups as main crosslinking groups and having an acid value of 0.6 to 30 mgKOH/g. In this technology, however, the compatibility between the resin and the fine particles is insufficient, the initial haze is high, and an increase in haze in a high-temperature environment or a high-temperature, high-humidity environment cannot be suppressed sufficiently.

Patent Literature 2 discloses a technology in which a dispersion containing cesium-containing composite tungsten oxide (CWO) fine particles and an acrylic pressure-sensitive adhesive resin having an acrylate skeleton and hydroxy groups as main crosslinking groups can provide reduced haze when containing a typical metal compound selected from zinc carbonate, zinc oxide, and magnesium oxide. However, this literature is silent on durability such as resistance to haze increase in a high-temperature, high-humidity environment.

CITATION LIST

Patent Literature

Patent Literature 1: WO 2008/064312 A
Patent Literature 2: JP 2010-163574 A

SUMMARY OF INVENTION

Technical Problem

The present invention has been accomplished in view of the above problems and circumstances, and an object of the present invention is to provide a near-infrared shielding film having low initial haze and resistance to haze increase in weathering tests, to provide a method for producing such a near-infrared shielding film, and to provide a pressure-sensitive adhesive composition.

Solution to Problem

In the process of conducting studies to find the cause of the problems and to solve the problems, the inventors have found that a technique for providing a near-infrared shielding film with a specific layer disposed on at least one surface of a transparent substrate, including a plurality of resins with hydroxy and acid values in specific ranges, and including tungsten oxide fine particles or composite tungsten oxide fine particles as infrared absorbers makes it possible to obtain a near-infrared shielding film having low initial haze and resistance to haze increase in weathering tests, to obtain a method for producing such a near-infrared shielding film, and to obtain a pressure-sensitive adhesive composition for use in such a near-infrared shielding film.

Specifically, the object of the present invention can be achieved by the following means.

1. A near-infrared shielding film including: a transparent substrate; and a component layer provided on at least one surface of the transparent substrate and including resin A shown below, at least one of resin B or C shown below, and oxide fine particles D shown below.
   Resin A: A resin having an acid value of less than 0.5 mgKOH/g and a hydroxy value of 5 to 60 mgKOH/g
   Resin B: A resin having an acid value of 1 to 60 mgKOH/g
   Resin C: A resin having an acid value of at least 1 mgKOH/g and a hydroxy value of 5 to 60 mgKOH/g
   Oxide fine particles D: Tungsten oxide fine particles or composite tungsten oxide fine particles 2. The near-infrared shielding film according to item 1, wherein the component layer is a pressure-sensitive adhesive layer.

3. The near-infrared shielding film according to item 1 or 2, further including a near-infrared reflecting layer capable of reflecting at least 20% of light with wavelengths of 800 to 1,300 nm, the near-infrared reflecting layer being provided on at least one surface of the transparent substrate where the component layer is provided.

4. A method for producing the near-infrared shielding film according to any one of items 1 to 3, the method including dispersing and mixing oxide fine particles D in resin A and then adding at least one of resin B or resin C to the mixture.

5. A pressure-sensitive adhesive composition including resin A shown below, at least one of resin B or C shown below, and oxide fine particles D shown below.
   Resin A: A resin having an acid value of less than 0.5 mgKOH/g and a hydroxy value of 5 to 60 mgKOH/g
   Resin B: A resin having an acid value of 1 to 60 mgKOH/g Resin C: A resin having an acid value of at least 1 mgKOH/g and a hydroxy value of 5 to 60 mgKOH/g Oxide fine particles D: Tungsten oxide fine particles or composite tungsten oxide fine particles Advantageous Effects of Invention The above means of the present invention makes it possible to provide a near-infrared shielding film having low initial haze and resistance to haze increase in weathering tests, to provide a method for producing such a near-infrared shielding film, and to provide a pressure-sensitive adhesive composition for use in such a near-infrared shielding film.

Why and how the effects of the present invention are produced, although not clear, may be as follows.

The present invention is based on findings that when a combination of an acrylic resin having hydroxy groups as main crosslinking groups and having hydroxy and acid values in specific ranges and an acrylic resin having carboxy groups as main crosslinking groups or a combination of an acrylic resin having hydroxy groups as main crosslinking groups and an acrylic resin having both carboxy and hydroxy groups as main crosslinking groups is used as a binder for tungsten oxide fine particles or composite tungsten oxide fine particles as infrared absorbers, the initial haze caused by the infrared absorbers can be effectively reduced and an increase in haze can be suppressed in a high-temperature, high-humidity environment.

The studies conducted by the inventors show that when only an acrylic resin having hydroxy groups as main crosslinking groups is used, the acrylic resin can agglomerate in a high-temperature, high-humidity environment to increase the haze. On the other hand, an acrylic resin having carboxy groups as main crosslinking groups has insufficient compatibility with tungsten oxide fine particles or composite tungsten oxide fine particles and provides relatively high haze.

In addition, only a resin having hydroxy and carboxy groups in the molecule has a low additive effect and is not enough to solve the above problems.

The present invention is characterized by appropriate use of two or more acrylic resins, including an acrylic resin having hydroxy groups as main crosslinking groups and having hydroxy and acid values in specific ranges and an acrylic resin having carboxy groups as main crosslinking groups, in combination as a binder for tungsten oxide fine particles or composite tungsten oxide fine particles. This would make it possible to reduce the disadvantage that would otherwise occur if each resin is used alone, while the advantage of each resin is utilized, so that the initial haze can be set low and an increase in haze can be suppressed in a high-temperature, high-humidity environment and in weathering tests.

DESCRIPTION OF EMBODIMENTS

Figure 1:
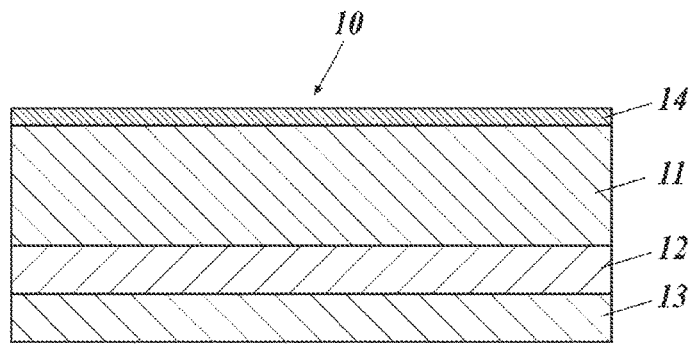
FIG. 1 is a cross-sectional view illustrating the structure of a near-infrared shielding film according to the present invention.

The near-infrared shielding film of the present invention includes a transparent substrate and a component layer that is provided on at least one surface of the substrate and includes resin A shown above, at least one of resin B or C shown above, and oxide fine particles D shown above. This feature is a technical feature common to the aspects of the present invention according to claims 1 to 5.

In an embodiment of the present invention, the component layer is preferably a pressure-sensitive adhesive layer constituting the near-infrared shielding film, in terms of producing the advantageous effects of the present invention and in order to produce a low-haze film with a thin layer capable of effectively shielding near-infrared rays.

In addition, the film for effectively shielding near-infrared rays preferably has a near-infrared reflecting layer capable of reflecting 20% or more of light with wavelengths of 800 to 1,300 nm on at least one surface of the transparent substrate where the component layer is provided.

A preferred method for producing the near-infrared shielding film of the present invention includes dispersing and mixing the tungsten oxide fine particles or composite tungsten oxide fine particles (d) in the resin (a) having an acid value of less than 0.5 mgKOH/g and a hydroxy value of 5 to 60 mgKOH/g; and then adding at least one of the resin (b) having an acid value of 1 to 60 mgKOH/g or the resin (c) having an acid value of 1 mgKOH/g or more and a hydroxy value of 5 to 60 mgKOH/g to the mixture, so that lower initial haze can be achieved.

In addition, a pressure-sensitive adhesive composition including, as compounds, the resin A, at least one of the resin B or C, and the oxide fine particles D is preferably used to form a pressure-sensitive adhesive layer for an near-infrared shielding film having a high near-infrared-shielding effect, a low initial haze, and resistance to haze increase in weathering tests. Hereinafter, the present invention, the elements of the present invention, and embodiments and modes for carrying out the present invention will be described in detail. As used herein, the word "to" means to include the values before and after it as the lower and upper limits.

<<Outline of the Near-infrared Shielding Film of the Present Invention>>

The near-infrared shielding film of the present invention includes a transparent substrate and a component layer that is provided on at least one surface of the substrate and includes, as compounds, resin A shown below, at least one of resin B or C shown below, and oxide fine particles D shown below.

Resin A: A resin having an acid value of less than 0.5 mgKOH/g and a hydroxy value of 5 to 60 mgKOH/g Resin B: A resin having an acid value of 1 to 60 mgKOH/g Resin C: A resin having an acid value of at least 1 mgKOH/g and a hydroxy value of 5 to 60 mgKOH/g Oxide fine particles D: Tungsten oxide fine particles or composite tungsten oxide fine particles In this regard, the acid value of a resin containing carboxy groups indicates the amount of all acidic components (e.g., carboxy and sulfo groups) in 1 g of the resin and is expressed as the number of mg of potassium hydroxide required to neutralize all acidic components. The acid value can be measured using a titration method, such as the method provided in JIS K 1557-1:2007.

When the resin is an acrylic pressure-sensitive adhesive, the acid value of the resin corresponds to the number of carboxy groups in 1 g of the resin.

The hydroxy value (also called hydroxyl value) of a resin is expressed as the number of mg of potassium hydroxide required to neutralize acetic acid bonded to hydroxy groups after 1 g of the resin containing the hydroxy groups is acetylated. Hydroxyl groups can be measured using a titration method, such as the method provided in JIS K 1557-1:2007.

In the context of the present invention, the term "near-infrared shielding" refers to having a transmittance of 20% or less, more preferably 15% or less, for near-infrared rays in the wavelength region of 800 to 1,100 nm.

In addition, when the near-infrared shielding film of the present invention is formed with a thickness of 25 μm, its haze value (initial haze value) measured according to JIS K 7136 is preferably controlled to 1.0% or less. The haze value is more preferably 0.8% or less, even more preferably 0.6% or less.

<Structure of the Near-infrared Shielding Film of the Present Invention>

The structure of the near-infrared shielding film of the present invention will be described with reference to the drawings.

FIG. 1 is a cross-sectional view illustrating the structure of the near-infrared shielding film of the present invention.

The near-infrared shielding film 10 of the present invention preferably includes a transparent substrate 11; a pressure-sensitive adhesive layer 12 that is provided on one surface of the transparent substrate 11 to function as a near-infrared shielding layer; a release layer 13 (separator film) on one surface the transparent substrate 11; and a hard coat layer 14 provided on the opposite surface of the transparent substrate 11. Any other appropriate functional layer may also be provided between the layers.

[1] Transparent Substrate

A transparent resin film is suitable for use as the transparent substrate of the near-infrared shielding film of the present invention. In the context of the present invention, the term "transparent" means that the visible light transmittance measured by the method according to JIS S 3107 (2013) is 50% or more, preferably 60% or more, more preferably 70% or more, even more preferably 80% or more.

The transparent substrate used in the present invention preferably has a thickness of 20 to 200 μm, more preferably 25 to 100 μm, even more preferably 30 to 70 μm. The transparent resin film with a thickness of 20 μm or more resists wrinkling, etc., during handling. The transparent resin film with a thickness of 200 μm or less can well conform to a curved glass surface when bonded to a glass substrate to form a glass laminate.

The transparent substrate used in the present invention is preferably a biaxially oriented polyester film. Alternatively, the transparent substrate may also be an unstretched polyester film or an at least uniaxially stretched polyester film. In order to improve strength or suppress thermal expansion, the substrate is preferably a stretched film. Particularly when the near-infrared shielding film of the present invention is used to form a near-infrared reflecting window film-containing glass laminate for use as a car front glass, the transparent substrate is more preferably a stretched film.

In the present invention, the transparent substrate preferably has a thermal shrinkage of 0.1 to 10.0%, more preferably 1.5 to 5.0% at a temperature of 150° C. in order to prevent the near-infrared shielding film from wrinkling or to prevent the near-infrared reflecting layer from cracking.

The transparent substrate for use in the near-infrared shielding film of the present invention may be of any transparent type. Preferably, the transparent substrate is any of various resin films, such as polyolefin films (e.g., polyethylene and polypropylene films), polyester films (e.g., polyethylene terephthalate and polyethylene naphthalate films), polyvinyl chloride films, and triacetylcellulose films.

The transparent substrate is preferably a polyester film or a triacetylcellulose film, more preferably a polyester film.

The transparent resin film for use as the transparent substrate can be produced by conventionally known common methods. For example, a resin material may be melted in an extruder, extruded through a circular die or a T-die, and then cooled rapidly, so that an unstretched transparent resin film can be produced, which is substantially amorphous and not oriented. The unstretched transparent resin film may be subjected to a known method such as uniaxial stretching, tenter sequential biaxial stretching, tenter simultaneous biaxial stretching, or tubular simultaneous biaxial stretching, so that a stretched transparent resin film can be produced by stretching in the transparent resin film feeding (longitudinal axis) direction or in a direction (transverse axis) perpendicular to the transparent resin film feeding direction. In this case, the stretch ratio may be selected appropriately depending on the resin as a raw material for the transparent resin film. Preferably, the stretch ratio is 2 to 10 times in each of the longitudinal and transverse axis directions.

For dimensional stability, the transparent resin film may also be subjected to a relaxing treatment or an off-line heat treatment. In the process of stretching and forming the polyester film, the relaxing treatment is preferably performed in a transverse stretching tenter or outside and downstream of the tenter after heat setting and before taking-up. The relaxing treatment is preferably performed at a temperature of 80 to 200° C., more preferably 100 to 180° C. The relaxing treatment is preferably performed at a relaxation rate of 0.1 to 10% in each of the longitudinal and transverse directions. The substrate having undergone the relaxing treatment can have improved heat resistance after subjected to the off-line heat treatment.

In the process of forming the film, an undercoat layer-forming coating liquid is preferably applied in-line to one or both surfaces of transparent resin film. In the present invention, the undercoating during the process of forming the film is called in-line undercoating. Examples of the resin for use in the undercoat layer-forming coating liquid useful in the present invention include polyester resins, acrylic-modified polyester resins, polyurethane resins, acrylic resins, vinyl resins, vinylidene chloride resins, polyethyleneimine vinylidene resins, polyethyleneimine resins, polyvinyl alcohol resins, modified polyvinyl alcohol resins, and gelatin, which are all preferably used. These undercoat layers may also contain a conventionally known additive. The undercoat layer may be formed by a known coating method such as roll coating, gravure coating, knife coating, dip coating, or spray coating. The amount of the coating for the undercoat layer is preferably from about 0.01 to about 2 g/m$^2$ (dry state).

[2] Resins in the Component Layer

The near-infrared shielding film of the present invention should be characterized by having a component layer including, as a binder, a combination of at least two resins including resin A and at least resin B or C, in which resin A is a resin having hydroxy groups as main crosslinking groups and having an acid value of less than 0.5 mgKOH/g and a hydroxy value of 5 to 60 mgKOH/g, resin B is a resin having carboxy groups as main crosslinking groups and having an acid value of 1 to 60 mgKOH/g, and resin C is a resin having both hydroxy and carboxy groups as main crosslinking groups and having an acid value of 1 mgKOH/g or more and a hydroxy value of 5 to 60 mgKOH/g.

The resins A, B, and C are preferably acrylic resins. The resins A, B, and C are each preferably an acrylic resin, so that the component layer containing the reins can be advantageously used as a pressure-sensitive adhesive layer having the effect of shielding near-infrared rays for the near-infrared shielding film.

[2.1] (a) Acrylic Resin Having Hydroxy Groups as Main Crosslinking Groups

The acrylic resin having hydroxy groups as main crosslinking groups (hereinafter also referred to as the hydroxyl-type acrylic resin) is a resin having an acid value of less than 0.5 mgKOH/g and a hydroxy value of 5 to 60 mgKOH/g and having hydroxy groups as main crosslinking groups, which is preferably a compound having an acrylate skeleton and hydroxy groups as main crosslinking groups. Specifically, the acrylic resin (a) may be a polymer obtained by polymerization of an alkyl acrylate or methacrylate (a-1) and a hydroxy group-containing monomer (a-2) copolymerizable with the monomer (a-1). An additional monomer (a-3) copolymerizable with the monomer (a-1) or (a-2) may also be added in the polymerization as long as the effects of the present invention are not impaired.

The hydroxy value is preferably in the range of 10 to 40 mgKOH/g, more preferably in the range of 10 to 30 mgKOH/g.

(a-1) Alkyl Acrylate and Alkyl Methacrylate

The alkyl acrylate may be a linear, branched, or cyclic C1 to C15 alkyl ester of acrylic acid. Examples of such an alkyl ester of acrylic acid include methyl acrylate, ethyl acrylate, n-propyl acrylate, tert-butyl acrylate, isopropyl acrylate, n-butyl acrylate, sec-butyl acrylate, tert-butyl acrylate, n-pentyl acrylate, isoamyl acrylate, n-hexyl acrylate, n-heptyl acrylate, n-octyl acrylate, 2-ethylhexyl acrylate, nonyl acrylate, decyl acrylate, dodecyl acrylate, isobornyl acrylate, and cyclohexyl acrylate.

The alkyl methacrylate may be a linear, branched, or cyclic C1 to C15 alkyl ester of methacrylic acid, examples of which include methyl methacrylate, ethyl methacrylate, n-propyl methacrylate, isopropyl methacrylate, n-butyl methacrylate, sec-butyl methacrylate, tert-butyl methacrylate, n-pentyl methacrylate, isoamyl methacrylate, dodecyl methacrylate, isobornyl methacrylate, and cyclohexyl methacrylate.

In particular, an alkyl acrylate with an alkyl group of 4 to 8 carbon atoms (C) is preferably used, so that the resulting pressure-sensitive adhesive can have good adhesion and flexibility. In particular, n-butyl acrylate and 2-ethylhexyl acrylate are preferred.

(a-2) Hydroxy Group-Containing Monomer Copolymerizable with Monomer (a-1)

Examples of the hydroxy group-containing monomer copolymerizable with the monomer (a-1) include 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 2-hydroxy-3-chloroproypyl acrylate, 2-hydroxy-3-chloroproypyl methacrylate, 2-hydroxy-3-phenoxyproypyl acrylate, 2-hydroxy-3-phenoxyproypyl methacrylate, and other hydroxy group-containing monomers.

(a-3) Additional Monomer Copolymerizable with Monomer (a-1) or (a-2)

The additional monomer copolymerizable with the monomer (a-1) or (a-2) may be such that it can be added in a small mount to improve adhesion and when it is used, the acid value and hydroxy value of the acrylic resin can be controlled to less than 0.5 mgKOH/g and in the range of 5 to 60 mgKOH/g, respectively. The additional monomer (a-3) copolymerizable with the monomer (a-1) or (a-2) may be, for example, an unsaturated bond-containing compound having one or more carboxy groups in the molecule. Examples of the additional monomer include acrylic acid, methacrylic acid, β-carboxyethyl acrylate, β-carboxyethyl methacrylate, 5-carboxypentyl acrylate, 5-carboxypentyl methacrylate, monoacryloyloxyethyl succinate, ω-carboxy-polycaprolactone monoacrylate, ω-carboxypolycaprolactone monomethacrylate, itaconic acid, crotonic acid, fumaric acid, maleic acid, and other carboxy group-containing monomers.

The additional monomer may also be an unsaturated bond-containing compound having one or more alkoxyacrylate groups in the molecule. Examples of such a compound include 2-methoxyethyl acrylate, 2-ethoxyethyl acrylate, 2-methoxypropyl acrylate, 3-methoxypropyl acrylate, 2-methoxybutyl acrylate, 4-methoxybutyl acrylate, and other alkoxyacrylates.

The additional monomer may also be an unsaturated bond-containing compound having one or more alkoxymethacrylate groups in the molecule. Examples of such a compound include 2-methoxyethyl methacrylate, 2-ethoxyethyl methacrylate, 2-methoxypropyl methacrylate, 3-methoxypropyl methacrylate, 2-methoxybutyl methacrylate, 4-methoxybutyl methacrylate, and other alkoxymethacrylates.

The additional monomer may also be an unsaturated bond-containing compound having one or more alkylene glycol acrylate moieties in the molecule. Examples of such a compound include ethylene glycol acrylate, polyethylene glycol acrylate, propylene glycol acrylate, polypropylene glycol acrylate, and other alkylene glycol acrylates.

The additional monomer may also be an unsaturated bond-containing compound having one or more alkylene glycol methacrylate moieties in the molecule. Examples of such a compound include ethylene glycol methacrylate, polyethylene glycol methacrylate, propylene glycol methacrylate, polypropylene glycol methacrylate, and other alkylene glycol methacrylates.

The additional monomer may also be an unsaturated group-containing compound having one or more aryl acrylate moieties in the molecule. Examples of such a compound include benzyl acrylate, phenoxyethyl acrylate, phenyl acrylate, and other aryl acrylates.

The additional monomer may also be an unsaturated group-containing compound having one or more aryl methacrylate moieties in the molecule. Examples of such a compound include benzyl methacrylate, phenoxyethyl methacrylate, phenyl methacrylate, and other aryl methacrylates.

Other examples of the additional monomer include vinyl acetate, styrene, α-methylstyrene, and allyl acetate.

[2.2] (b) Acrylic Resin Having Carboxy Groups as Main Crosslinking Groups

In the present invention, the acrylic resin having carboxy groups as main crosslinking groups (hereinafter also referred to as the carboxyl-type acrylic resin) is an acrylic resin having an acid value of 1 to 60 mgKOH/g, preferably 5 to 30 mgKOH/g, more preferably 5 to 20 mgKOH/g, even more preferably 5 to 10 mgKOH/g. When the resin has an acid value of 1 mgKOH/g or more, the tungsten oxide particles or the composite tungsten oxide fine particles can have good dispersibility in the resin, so that the increase in haze can be suppressed. The resin with an acid value of 60 mgKOH/g or less can improve the removability of the reworkable product. In particular, the resin preferably has an acid value of 5 to 10 mgKOH/g, so that the tungsten oxide particles or the composite tungsten oxide fine particles can have higher dispersibility in the resin and therefore have a higher ability to absorb near-infrared rays.

The acrylic resin having carboxy groups as main crosslinking groups may be a (meth)acrylic pressure-sensitive adhesive polymer having an acid value of 1 to 60 mgKOH/g and including a repeating unit derived from (meth)acrylic acid or any other carboxy group-containing monomer. The acrylic resin having carboxy groups may be, for example, a copolymer obtained by polymerization of at least two monomers including (meth)acrylic acid and any other optional monomer, or a copolymer obtained by copolymerization of at least two monomers including a (meth)acrylate, a non-(meth)acrylate carboxy group-containing monomer, and any other optional monomer. The acrylic resin having carboxy groups is generally a copolymer of an alkyl (meth) acrylate monomer having an alkyl group of 1 to 18 carbon atoms and a monomer having a carboxy group and an alkyl group of 1 to 18 carbon atoms, or a copolymer of at least two monomers including (meth) acrylic acid having an alkyl group of 1 to 18 carbon atoms and an alkyl (meth) acrylate monomer having an alkyl group of 1 to 18 carbon atoms.

Examples of the carboxy group-containing monomer for forming a repeating unit of the acrylic resin include (meth) acrylic acid, itaconic acid, crotonic acid, maleic acid, monobutyl maleate, vinyl acetate, β-carboxyethyl acrylate, and other carboxy group-containing vinyl monomers.

Besides the above monomers, a monomer having any other functional group may also be copolymerized to form the acrylic resin for use in the present invention as long as the properties of the acrylic resin are not impaired. Example of the monomer having any other functional group include hydroxy group-containing monomers such as 2-hydroxyethyl (meth)acrylate, 2-hydroxypropyl (meth)acrylate, and allyl alcohol; amide group-containing monomers such as (meth)acrylamide, N-methyl(meth)acrylamide, and N-ethyl (meth)acrylamide; monomers having amide and methylol groups such as N-methylol(meth)acrylamide and dimethylol (meth)acrylamide; amino group-containing monomers such as aminomethyl (meth)acrylate, dimethylaminoethyl (meth) acrylate, and vinylpyridine, and other functional group-containing monomers; and epoxy group-containing monomers such as allyl glycidyl ether and (meth)acrylate glycidyl ether. Other examples include fluorine substituted alkyl (meth)acrylates, (meth)acrylonitrile, vinyl group-containing aromatic compounds such as styrene and methylstyrene, vinyl acetate, and halogenated vinyl compounds.

Besides monomers having a functional group other than a carboxy group, such as those shown above, other ethylenic double bond-containing monomers may also be used to form repeating units for the acrylic resin for use in the present invention. Examples of such ethylenic double bond-containing monomers include diesters of α,β-unsaturated dibasic acids, such as dibutyl maleate, dioctyl maleate, and dibutyl fumarate; vinyl esters such as vinyl acetate and vinyl propionate; vinyl ether; vinyl aromatic compounds such as styrene, α-methylstyrene, and vinyltoluene; and (meth)acrylonitrile.

A compound having two or more ethylenic double bonds may also be used in combination with the ethylenic double bond-containing monomer mentioned above. Examples of such a compound include divinylbenzene, diallyl maleate, diallyl phthalate, ethylene glycol di(meth)acrylate, trimethylolpropane tri(meth)acrylate, and methylenebis(meth)acrylamide.

Besides the monomers described above, alkoxyalkyl chain-containing monomers may also be used. Examples of alkoxyalkyl (meth)acrylates include 2-methoxyethyl (meth) acrylate, methoxyethyl (meth)acrylate, 2-methoxypropyl (meth)acrylate, 3-methoxypropyl (meth)acrylate, 2-methoxybutyl (meth)acrylate, 4-methoxybutyl (meth) acrylate, 2-ethoxyethyl (meth)acrylate, 3-ethoxypropyl (meth)acrylate, and 4-ethoxybutyl (meth)acrylate.

Examples of commercially available acrylic pressure-sensitive adhesive resins having carboxy groups include COPONYL 5705-L, 5407, N-2147, and 5698 (all trade names, manufactured by The Nippon Synthetic Chemical Industry Co., Ltd.), SAIVINOL AT-361 (trade name, manufactured by Saiden Chemical Industry Co., Ltd.), PE123 (trade name, manufactured by NIPPON CARBIDE INDUSTRIES CO., INC.), and SK-Dyne SK2094, SK1850G, SK2006, SK1888, SK1831, and SK1863 (all trade names, manufactured by Soken Chemical & Engineering Co., Ltd.), which are preferably used in view of adhesion and lower haze.

[2.3] (c) Acrylic Resin Having Both Hydroxy and Carboxy Groups in Molecule

In the present invention, the acrylic resin (c) having both hydroxy and carboxy groups in the molecule (hereinafter also referred to as the hydroxyl/carboxyl-type acrylic resin) is a resin having an acid value of 1 mgKOH/g or more and a hydroxy value of 5 to 60 mgKOH/g.

The acid value is preferably in the range of 1 to 30 mgKOH/g or in the range of 5 to 10 mgKOH/g in order to improve the dispersibility of the fine particles mentioned above and to reduce the initial haze.

The acrylic resin (c) may be a copolymer of the monomer (a-1) or (a-2) described above and an unsaturated bond-containing monomer having one or more carboxy groups in the molecule. Examples of such a monomer include acrylic acid, methacrylic acid, β-carboxyethyl acrylate, β-carboxyethyl methacrylate, 5-carboxypentyl acrylate, 5-carboxypentyl methacrylate, monoacryloyloxyethyl succinate, ω-carboxypolycaprolactone monoacrylate, ω-carboxypolycaprolactone monomethacrylate, itaconic acid, crotonic acid, fumaric acid, maleic acid, and other carboxy group-containing monomers.

The acrylic resin (c) is preferably prepared by copolymerizing, in an appropriate ratio, a carboxyl-free monomer and a carboxyl-containing monomer, which can be used for the preparation of the carboxyl-type acrylic resin (b). In this way, the desired physical properties such as controlled hydroxy and acid values can be imparted to the acrylic resin having both hydroxy and carboxy groups in the molecule.

Examples of the carboxyl-free monomer that can be used in this process include the alkyl (meth)acrylates listed above, specifically, alkyl (meth)acrylate monomers having an alkyl group of 1 to 18 carbon atoms.

[2.4] Curing Agent

In the present invention, the resins A, B, and C are preferably mixed with a curing agent to form a binder.

The curing agent may be selected from, for example, an epoxy crosslinking agent, a metal chelate crosslinking agent, and an isocyanate crosslinking.

In particular, an isocyanate crosslinking agent is preferred, and an isocyanate crosslinking agent is preferably used in combination with a metal chelate crosslinking agent.

Examples of the isocyanate crosslinking agent include polyisocyanate compounds having two or more isocyanate groups in the molecule, such as tolylene diisocyanate, xylylene diisocyanate, hydrogenated xylylene diisocyanate, chlorophenylene diisocyanate, hexamethylene diisocyanate, tetramethylene diisocyanate, isophorone diisocyanate, diphenylmethane diisocyanate, hydrogenated diphenylmethane diisocyanate, tetramethylxylylene diisocyanate, naphthalene diisocyanate, triphenylmethane triisocyanate, and polymethylene polyphenyl isocyanate; compounds obtained by addition reaction of these compounds with a polyhydric alcohol such as trimethylolpropane or pentaerythritol, and biuret or isocyanurate forms of these polyisocyanate compounds; and urethane prepolymers having two or more isocyanate groups per molecule, which are obtained by addition reaction of these polyisocyanate compounds with known polyether polyols, polyester polyols, acrylic polyols, polybutadiene polyols, polyisoprene polyols, or other polyols.

Examples of the epoxy crosslinking agent include bisphenol-A-epichlorohydrin type epoxy resins, ethylene glycidyl ether, polyethylene glycol diglycidyl ether, glycerol diglycidyl ether, glycerol triglycidyl ether, 1,6-hexanediol diglycidyl ether, trimethylolpropane triglycidyl ether, diglycidylaniline, diamineglycidylamine, N,N,N',N'-tetraglycidyl-m-xylylenediamine, 1,3-bis(N,N-diamineglycidylaminomethyl)cyclohexane, and other compounds having two or more epoxy groups per molecule.

Examples of the metal chelate crosslinking agent include compounds formed by coordination of acetylene or ethyl acetoacetate to a polyvalent metal such as aluminum, iron, copper, zinc, tin, titanium, nickel, antimony, magnesium, vanadium, chromium, or zirconium.

The hydroxyl-type acrylic resin and the curing agent may be added to the infrared shielding film-forming dispersion described above to form a near-infrared shielding layer-forming coating liquid, which may be applied to the surface of the transparent substrate to form a coating film. Subsequently, the coating film may be subjected to an aging treatment in which the solvent is removed from the coating film and the acrylic pressure-sensitive adhesive resins undergo a crosslinking reaction, so that the infrared shielding layer described above can be formed. An example of the aging treatment may be a heat treatment at a certain temperature where the crosslinking reaction is allowed to proceed.

[3] (d) Tungsten Oxide Fine Particles and Composite Tungsten Oxide Fine Particles The near-infrared shielding film of the present invention contains oxide fine particles D: tungsten oxide fine particles or composite tungsten oxide fine particles, as infrared absorbers, which produce the effect of shielding near-infrared rays.

The tungsten oxide fine particles or the composite tungsten oxide fine particles can absorb, by themselves, light wavelengths of 800 to 1,100 nm in the entire near-infrared region.

The tungsten oxide fine particles may include fine particles of a tungsten oxide represented by the formula $W_yO_z$, wherein W is tungsten, O is oxygen, and $2.2 \leq z/y < 3.0$. The composite tungsten oxide fine particles may include fine particles of a composite tungsten oxide represented by the formula $M_xW_yO_z$, wherein M is at least one element selected from H, He, alkali metals, alkaline-earth metals, rare-earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, $0.001 \leq x/y \leq 1.0$, and $2.2 \leq z/y \leq 3.0$.

The fine particles of the tungsten oxide of the formula $W_yO_z$ ($2.2 \leq z/y \leq 3.0$) may be, for example, fine particles of $W_{18}O_{49}$, $W_{20}O_{58}$, or $W_4O_{11}$. When the z/y value is 2.2 or more, the occurrence of an undesired $WO_2$ crystal phase in the infrared shielding material can be completely avoided, and the material can be made chemically stable. On the other hand, when the z/y value is 2.999 or less, a sufficient amount of free electrons can be produced so that an efficient infrared-shielding material can be obtained. In addition, the $W_yO_z$ compound with the z/y range satisfying $2.45 \leq z/y \leq 2.999$ is a compound having what is called a Magneli phase, which has high durability.

The fine particles of the composite tungsten oxide of the formula $M_xW_yO_z$ ($0.001 \leq x/y \leq 1.0$, $2.2 \leq z/y \leq 3.0$) should preferably have at least one crystal structure selected from hexagonal, tetragonal, and cubic crystal structures, because they can be highly durable when having a hexagonal, tetragonal, or cubic crystal structure. For example, when having a hexagonal crystal structure, the composite tungsten oxide fine particles should preferably contain, as the M element, at least one element selected from Cs, Rb, K, Tl, In, Ba, Li, Ca, Sr, Fe, and Sn. In this case, the M element is preferably added in such an amount that x/y is from 0.001 to 1, more preferably added in such an amount that x/y is around 0.33. This is because the x/y value calculated theoretically from the hexagonal crystal structure is 0.33 and good optical properties can be obtained with such an amount that the x/y value is around 0.33. On the other hand, the oxygen content z is preferably such that z/y is from 2.2 to 3.0. Typical examples include $Cs_{0.33}WO_3$, $Rb_{0.33}WO_3$, $K_{0.33}WO_3$, and $Ba_{0.33}WO_3$. However, other examples can also have useful near-infrared absorbing properties or infrared shielding properties as long as x, y, and z are fall within the ranges shown above.

The tungsten oxide fine particles or the composite tungsten oxide fine particles may be used alone. A mixture of the tungsten oxide fine particles and the composite tungsten oxide fine particles can also be preferably used.

When at least either of the tungsten oxide fine particles and the composite tungsten oxide fine particles are used to form a component layer-forming dispersion having infrared shielding properties, the average dispersed particle size is preferably 800 nm or less, more preferably 200 nm or less, even more preferably 100 nm or less. If the average dispersed particle size of the tungsten oxide or the composite tungsten oxide exceeds 800 nm, the oxide can scatter light with wavelengths of 380 nm to 780 nm in the visible light region by geometric scattering or Mie scattering. If the average dispersed particle size is 200 nm or less, geometric scattering or Mie scattering will decrease, and the scattering can be in the Rayleigh scattering region. In the Rayleigh scattering region, the scattered light will decrease in inverse proportion to the sixth power of the average dispersed particle size, so that the scattering of visible light will decrease while the transparency will increase. In addition, the average dispersed particle size is preferably 100 nm or less, so that scattered light can be reduced to a very low level. When the average dispersed particle size is 800 nm or less, the haze will decrease with decreasing average dispersed particle size.

The content of the tungsten oxide fine particles or the composite tungsten oxide fine particles in the component layer is preferably from 1 to 80% by mass, more preferably from 5 to 50% by mass, based on the total mass of the component layer. When the content is 1% or more, the effect of shielding near-infrared rays can be produced sufficiently, and when the content is 80% or less, a sufficient amount of visible light can be transmitted.

[4] Method for Forming Pressure-sensitive Adhesive Layer

In the near-infrared shielding film of the present invention, the component layer including the component (a), at least one of the component (b) or (c), and the component (d) is preferably a pressure-sensitive adhesive layer having a near-infrared shielding function.

The pressure-sensitive adhesive layer preferably has a thickness of 0.1 to 50 μm, more preferably 1 to 20 μm. The pressure-sensitive adhesive layer with a thickness of 0.1 μm or more tends to have a higher ability to absorb infrared rays. On the other hand, the pressure-sensitive adhesive layer with a thickness of 50 μm or less can have improved coating crack resistance.

The pressure-sensitive adhesive layer may be formed by any appropriate method. For example, the pressure-sensitive adhesive layer may be formed by a process that includes preparing a pressure-sensitive adhesive layer-forming coating liquid including the respective components including the resins and the fine particles, then applying the coating liquid using a wire bar or other means, drying the coating, and curing the resins by heating or other means.

The pressure-sensitive adhesive layer-forming coating liquid including the respective components including the resins and the fine particles according to the present invention can be prepared by the following steps.

(1) Preparation of a Dispersion of Tungsten Oxide Fine Particles or Composite Tungsten Oxide Fine Particles A dispersion of the tungsten oxide fine particles or the composite tungsten oxide fine particles according to the present invention can be obtained by, for example, mixing the essential components, namely, the tungsten oxide fine particles or the composite tungsten oxide fine particles and optionally a dispersant into a proper amount of a solvent and optionally subjecting the mixture to an appropriate dispersing treatment.

(2) Preparation of Resin Varnish

Aside from the dispersion of the tungsten oxide fine particles or the composite tungsten oxide fine particles, the resins according to the present invention are mixed in appropriate amounts with a solvent to form a varnish.

(3) Preparation of Pressure-sensitive Adhesive Layer-forming Composition

The dispersion of the tungsten oxide fine particles or the composite tungsten oxide fine particles and the resin-containing varnish are mixed and thoroughly stirred to form a desired pressure-sensitive adhesive layer-forming composition.

In order to obtain the initial haze-reducing effect, the method for producing the near-infrared shielding film of the present invention preferably includes dispersing the oxide fine particles D in the resin (a) and then adding the resin B or C to the dispersion, wherein the oxide fine particles D are the tungsten oxide fine particles or the composite tungsten oxide fine particles, the resin (a) is the resin having an acid value of less than 0.5 mgKOH/g and a hydroxy value of 5 to 60 mgKOH/g, the resin B is the resin having an acid value of 1 to 60 mgKOH/g, and the resin C is the resin having an acid value of 1 mgKOH/g or more and a hydroxy value of 5 to 60 mgKOH/g. This may be because when the oxide fine particles D are initially dispersed in the resin A, agglomeration of the fine particles can be suppressed during the dispersion.

[4.1] Solvent

The solvent is used for the purposes of uniformly mixing and dispersing the pressure-sensitive adhesive layer-forming coating liquid and imparting coatability to the coating liquid.

Examples of the solvent include ketones (such as acetone, methyl ethyl ketone, methyl isobutyl ketone (MIBK), cyclohexanone, and diacetone alcohol), ethers (such as dioxane and tetrahydrofuran), aliphatic hydrocarbons (such as hexane), alicyclic hydrocarbons (such as cyclohexane), aromatic hydrocarbons (such as toluene and xylene), carbon halides (such as dichloromethane and dichloroethane), esters (such as methyl formate, methyl acetate, ethyl acetate, and butyl acetate), water, alcohols (such as ethanol, isopropanol, butanol, and cyclohexanol), cellosolves (such as methyl cellosolve, ethyl cellosolve, and butyl cellosolve), cellosolve acetates, sulfoxides (such as dimethyl sulfoxide), and amides (such as dimethylformamide and dimethylacetamide). Solvents of any mixtures thereof may also be used.

[4.2] Other Components

In the present invention, the pressure-sensitive adhesive layer-forming coating liquid having near-infrared shielding properties may further contain at least one of a metal deactivator, a plasticizer, an antioxidant, a filler, a silane coupling agent, and other agents, as long as the effects of the present invention are not impaired.

In addition, the coating liquid preferably contains the dispersant or the surfactant described below.

(Dispersant)

The dispersant can adsorb to the fine particles to be dispersed and facilitate wetting of agglomerated fine particles with the solvent or the like. Thus, the dispersant has functions such as facilitation of deagglomeration of fine particles to primary particles, prevention of agglomeration, reduction of viscosity, improvement of fluidity, and prevention of sedimentation. In the present invention, a known resin-type dispersant or inorganic dispersant may be used, as appropriate, to disperse the fine particles or the composite tungsten oxide fine particles in the pressure-sensitive adhesive resin.

The resin-type dispersant, which has a fine-particle-affinity site with the property of adsorbing to the fine particles; and a site compatible with the resins and solvent, can adsorb to the fine particles and function to stabilize the dispersion of the fine particles in the resin and solvent. The resin-type dispersant can also function to increase the surface charge of the fine particles or to increase the repulsive force between the particles by steric hindrance (excluded volume effect). Examples of the resin-type dispersant that can be used include polyurethane, polycarboxylates such as polyacrylate, unsaturated polyamide, polycarboxylic acid, polycarboxylic acid (partial) amine salts, polycarboxylic acid ammonium salts, polycarboxylic acid alkylamine salts, polysiloxane, long-chain polyaminoamide phosphoric acid salts, hydroxyl group-containing polycarboxylates, modification products thereof, amides formed by the reaction of poly(lower alkyleneimine) with a polyester having free carboxy groups, and salts of such amides. Other examples that can be used include water-soluble resins or water-soluble polymer compounds, such as (meth)acrylic acid-styrene copolymers, (meth)acrylic acid-(meth)acrylate copolymers, styrene-maleic acid copolymers, polyvinyl alcohol, and polyvinylpyrrolidone, polyesters, modified polyacrylate, and ethylene oxide-propylene oxide adducts. Any of these dispersants may be used alone or in the form of a mixture of two or more.

Examples of the inorganic dispersant include phosphate compounds such as sodium hexametaphosphate and sodium pyrophosphate, and silicate compounds such as sodium silicate and potassium silicate.

(Surfactant)

The surfactant plays a role in assisting the function of the dispersant.

Examples of the surfactant include anionic surfactants such as sodium lauryl sulfate, polyoxyethylene alkyl ether sulfate, sodium dodecylbenzenesulfonate, an alkali salt of a styrene-acrylic acid copolymer, sodium stearate, sodium alkylnaphthalenesulfonate, sodium alkyl diphenyl ether disulfonate, lauryl sulfate monoethanolamine, lauryl sulfate triethanolamine, ammonium lauryl sulfate, stearic acid monoethanolamine, sodium stearate, and monoethanolamine of a styrene-acrylic acid copolymer; nonionic surfactants such as polyoxyethylene oleyl ether, polyoxyethylene lauryl ether, polyoxyethylene nonyl phenyl ether, polyoxyethylene sorbitan monostearate, and polyethylene glycol monolaurate; cationic surfactants such as alkyl quaternary ammonium salts and ethylene oxide adducts thereof; amphoteric surfactants such as alkyl betaines including alkyldimethylaminoacetic acid betaine, and alkylimidazoline; silicone surfactants; and fluorosurfactants. Any of these surfactants may be used alone or in the form of a mixture of two or more.

Other examples of the surfactant include polyoxyethylene alkyl ethers such as polyoxyethylene stearyl ether, polyoxyethylene alkyl phenyl ethers such as polyoxyethylene octyl phenyl ether, polyethylene glycol diesters such as polyethylene glycol dilaurate and polyethylene glycol distearate, sorbitan fatty acid esters, fatty acid-modified polyesters, tertiary amine-modified polyurethanes, and other polymer surfactants. Any of these surfactants may be used alone or in the form of a mixture of two or more.

[4.3] Method for Forming Pressure-sensitive Adhesive Layer

The pressure-sensitive adhesive layer may be formed using any known coating method. For example, the pressure-sensitive adhesive layer-forming coating liquid prepared as described above may be applied by a coating method to form the pressure-sensitive adhesive layer. Preferred examples of the coating method include die coater method, gravure roll coater method, blade coater method, spray coater method, air knife coating, dip coating, and transfer method, which may be used alone or in any combination.

[5] Other Component Layers for the Near-infrared Shielding Film

The near-infrared shielding film of the present invention may further include, on the transparent substrate, a layer for imparting an additional function, such as a near-infrared reflecting layer, an adhesion facilitating layer, a conductive layer, an antistatic layer, a gas barrier layer, an anti-fouling layer, a deodorant layer, an anti-fog layer, a lubricating layer, a hard coat layer, a wear resistant layer, an electromagnetic wave shielding layer, an ultraviolet absorbing layer, a printing layer, a fluorescent emission layer, a hologram layer, or a release layer.

In particular, the near-infrared shielding film preferably has a near-infrared reflecting layer, a hard coat layer, and a release layer (called a release film or a separator) for protecting the pressure-sensitive adhesive layer.

[5.1] Near-infrared Reflecting Layer

The near-infrared shielding film of the present invention preferably has a near-infrared reflecting layer capable of reflecting 20% or more of light with wavelengths of 800 to 1,300 nm, which is provided on at least one surface of the transparent substrate, where the component layer (pressure-sensitive adhesive layer) is provided.

In the present invention, examples of the near-infrared reflecting layer that can be used include, but are not limited to, commercially available infrared reflecting films described in U.S. Pat. No. 6,049,419 and manufactured by 3M Company (3M Scotchtint (registered trademark) Multi-layer NANO series (transparent infrared-reflecting films having a light transmittance of less than 20% in the light wavelength range of 850 to 1,100 nm)), the multilayer film described in JP 2012-81748 A (a film composed of at least two thermoplastic resins with different optical properties, alternately stacked each in at least 50 layers, which has an average reflectance of 15% or less at light wavelengths of 400 to 700 nm and an average reflectance of 70% or more at light wavelengths of 900 to 1,200 nm), and the near-infrared reflecting film described in JP 2012-057199 W, which is composed of a number of alternately stacked high and low refractive index layers each containing a metal oxide and a binder.

In particular, the near-infrared reflecting layer according to the present invention is preferably a layer including a number of alternately stacked high and low refractive index layers, in which the high refractive index layers include a first water-soluble binder resin and first metal oxide particles, and the low refractive index layers include a second water-soluble binder resin and second metal oxide particles.

The near-infrared reflecting layer for use in the present invention may be of any type having at least one stack (unit) of high and low refractive index layers. Preferably, the near-infrared reflecting layer has two or more stacks of high and low refractive index layers. In this case, the uppermost and lowermost layers of the near-infrared reflecting layer may be any of the high and low refractive index layers, but preferably, the uppermost and lowermost layers are both low refractive index layers. Preferably, when the uppermost layer is a low refractive index layer, good coatability can be obtained, and when the lowermost layer is a low refractive index layer, good adhesion to the substrate can be achieved.

In this regard, whether any refractive index layer in the near-infrared reflecting layer is a high or low refractive index layer can be determined by comparing the refractive indices of the adjacent reflective index layers. Specifically, when a certain refractive index layer is selected as a reference layer and when the refractive index layer adjacent to the reference layer has a refractive index lower than that of the reference layer, the reference layer is determined as a high refractive index layer (and the adjacent layer is determined as a low refractive index layer). On the other hand, when the adjacent layer has a refractive index higher than that of the reference layer, the reference layer is determined as a low refractive index layer (and the adjacent layer is determined as a high refractive index layer). Therefore, whether a certain refractive index layer is a high or low refractive index layer is determined by the relative relationship between the refractive indices of it and its adjacent layer, and a certain refractive index layer can be either a high or low refractive index layer depending on the relationship with its adjacent layer.

In this case, a component in the high refractive index layer (hereinafter also referred to as the "high refractive index layer component") and a component in the low refractive index layer (hereinafter also referred to as the "low refractive index layer component") can mix at the interface between the two layers to form a layer (mixture layer) including the high and low refractive index components. In this case, a collection of sites with a high refractive index layer component content of 50% by mass or more in the mixture layer is identified as the high refractive index layer, and a collection of sites with a low refractive index layer component content of more than 50% by mass in the mixture layer is identified as the low refractive index layer. Specifically, for example, when the low and high refractive index layers contain different types of metal oxide particles, the profile of the concentration of the metal oxide particles in the multilayer film may be measured in the film thickness direction, so that the measured composition can be used to determine whether the formable mixture layer is the high or low refractive index layer. The profile of the concentration of the metal oxide particles in the multilayer film can be observed by measuring the atomic composition ratio while etching the film in the depth direction from the surface by sputtering at a rate of 0.5 nm/minute using an XPS surface analyzer, in which the outermost surface is designated as 0 nm. Also when the low or high refractive index component contains no metal oxide particles and includes only a water-soluble resin, the water-soluble resin concentration profile may also be determined by, for example, measuring the carbon concentration in the thickness direction, so that the existence of any mixture region can be observed, and the composition of the film may also be measured by energy dispersive X-ray spectroscopy (EDX), so that each layer exposed by sputter etching can be identified as the high or low refractive index layer.

The XPS surface analyzer may be of any type. For example, ESCALAB-200R manufactured by VG Scientific is used as the XPS surface analyzer. The measurement is performed at a power of 600 W (accelerating voltage 15 kV, emission current 40 mA) using Mg for the X-ray anode.

In general, the near-infrared reflecting layer is preferably designed to have a large difference in refractive index between the low and high refractive index layers, so that it can have a higher near-infrared reflectance with a smaller number of layers. In this embodiment, at least one stack (unit) of low and high refractive index layers preferably has a refractive index difference of 0.1 or more, more preferably 0.3 or more, even more preferably 0.35 or more, further more preferably more than 0.4, between the adjacent low and high refractive index layers. When the near-infrared reflecting layer has two or more stacks (units) of high and low refractive index layers, the refractive index difference between the high and low refractive index layers in all the stacks (units) preferably falls within the above preferred range. Even in such a case, however, the refractive index layer constituting the uppermost or lowermost layer of the near-infrared reflecting layer may make a refractive index difference out of the preferred range.

From the above points of view, the number of the refractive index layers in the near-infrared reflecting layer (the number of units of the high and low refractive index layers) is preferably 100 or less (namely 50 or less units), more preferably 40 or less (20 or less units), even more preferably 20 or less (10 or less units).

The reflection at the interface between the adjacent layers depends on the refractive index ratio between the layers, and as the refractive index ratio increases, the reflectance increases. The optical path difference between the reflected light from the surface of a monolayer film and the reflected light from the bottom of the monolayer film can be set to satisfy the relationship represented by n·d=wavelength/4. In this case, owing to the retardation, the reflected light beams can be controlled to strengthen each other, so that the reflectance can be increased. In the formula, n is the refractive index, d is the physical film thickness, and n·d is the optical film thickness. The optical path difference can be utilized to control the reflection. On the basis of the relationship, the reflection of visible light and near-infrared light can be controlled by controlling the refractive index and thickness of each layer.

In other words, the reflectance in a specific wavelength region can be increased by selecting the refractive index of each layer, the thickness of each layer, and how to stack the respective layers.

The near-infrared shielding film of the present invention may be used as a heat-shielding window film. In this case, a multilayer film including a stack of layers with different refractive indices is preferably formed on the polymer film, and the optical thickness and the unit are preferably so designed that the multilayer film has a transmittance of 50% or more in the visible light region as measured according to JIS R 3106:1998 and also has a reflectance of more than 40% in a region within the wavelength range of 900 to 1,400 nm.

<Refractive Index Layers (High and Low Refractive Index Layers)>

[High Refractive Index Layer]

The high refractive index layer includes a first water-soluble binder resin and first metal oxide particles and, if necessary, may contain, for example, a curing agent, any other binder resin, a surfactant, and various additives.

In the present invention, the high refractive index layer preferably has a refractive index of 1.80 to 2.50, more preferably 1.90 to 2.20.

(First Water-soluble Binder Resin)

In the present invention, the first water-soluble binder resin is such that when it is dissolved at a concentration of 0.5% by mass in water at a temperature where it is most soluble and then the solution is filtered through a G2 glass filter (40 to 50 µm in maximum pore size), the mass of the insoluble material separated by the filtration is 50% by mass or less of it added.

In the present invention, the first water-soluble binder resin preferably has a weight average molecular weight of 1,000 to 200,000. The weight average molecular weight is more preferably in the range of 3,000 to 40,000.

Concerning the present invention, the weight average molecular weight may be measured using any known method, such as static light scattering, gel permeation chromatography (GPC), or time-of-flight mass spectrometry (TOF-MASS). In the present invention, gel permeation chromatography, a common known method, should be used to measure the weight average molecular weight.

The content of the first water-soluble binder resin in the high refractive index layer is preferably in the range of 5 to 50% by mass, more preferably in the range of 10 to 40% by mass, based on 100% by mass of the solids in the high refractive index layer.

The first water-soluble binder resin for use in the high refractive index layer is preferably polyvinyl alcohol. The water-soluble binder resin for use in the low refractive index layer described below is also preferably polyvinyl alcohol. Hereinafter, therefore, polyvinyl alcohol for use in the high and low refractive index layers will be described.

<Polyvinyl Alcohol>

In the present invention, the high and low refractive index layers preferably contain two or more different polyvinyl alcohols with different degrees of saponification. Now, for the sake of distinction, polyvinyl alcohol for use as the water-soluble binder resin in the high refractive index layer will be called polyvinyl alcohol (A), and polyvinyl alcohol for use as the water-soluble binder resin in the low refractive index layer will be called polyvinyl alcohol (B). Each refractive index layer may contain two or more polyvinyl alcohols with different degrees of saponification or polymerization. In such a case, the polyvinyl alcohol at the highest content in each high or low refractive index layer will be called polyvinyl alcohol (A) or (B).

In the context of the present invention, the term "degree of saponification (saponification degree)" refers to the ratio of the number of hydroxy groups to the total number of acetyloxy groups (derived from vinyl acetate as a raw material) and hydroxy groups.

As regards the term "polyvinyl alcohol at the highest content in each refractive index layer," polyvinyl alcohols with a saponification degree difference of 3 mol % or less are assumed to be identical when the degree of polymerization is calculated. As exceptions, polyvinyl alcohols with a low degree of polymerization of 1,000 or less are handled as different polyvinyl alcohols (not assumed to be identical even if they include polyvinyl alcohols with a saponification degree difference of 3 mol % or less). Specifically, when polyvinyl alcohols with degrees of saponification of 90 mol %, 91 mol %, and 93 mol % are contained at 10% by mass, 40% by mass, and 50% by mass, respectively, in the same layer, the three polyvinyl alcohols are assumed to be identical, and the mixture of the three polyvinyl alcohols is called polyvinyl alcohol (A) or (B). As regards the term "polyvinyl alcohols with a saponification degree difference of 3 mol % or less," the difference 3 mol % or less may be determined with respect to any polyvinyl alcohol. For example, when the layer contains polyvinyl alcohols with degrees of saponification of 90 mol %, 91 mol %, 92 mol %, and 94 mol %, they may be assumed to be identical because all the saponification degree differences between 91 mol % polyvinyl alcohol and other polyvinyl alcohols fall within 3 mol %.

The absolute value of the difference between the degrees of saponification of polyvinyl alcohols (A) and (B) is preferably 3 mol % or more, more preferably 5 mol % or more. Preferably, in such a range, a good mixed state can be formed between the high and low refractive index layers. The saponification degree difference between polyvinyl alcohols (A) and (B) is preferably as large as possible. In view of the solubility of polyvinyl alcohol in water, however, the difference is preferably 20 mol % or less.

In view of solubility in water, polyvinyl alcohols (A) and (B) preferably have a degree of saponification of 75 mol % or more. More preferably, one of polyvinyl alcohols (A) and (B) has a degree of saponification of 90 mol % or more and the other has a degree of saponification of 90 mol % or less, so that a good mixed state can be formed between the high and low refractive index layers. Even more preferably, one of polyvinyl alcohols (A) and (B) has a degree of saponification of 95 mol % or more and the other has a degree of saponification of 90 mol % or less. The upper limit of the degree of saponification of polyvinyl alcohols is generally, but not limited to, less than 100 mol % or about 99.9 mol % or less.

When two polyvinyl alcohols with different degrees of saponification are used, they preferably have a degree of polymerization of 1,000 or more, more preferably 1,500 to 5,000, even more preferably 2,000 to 5,000. This is because when the degree of polymerization of the polyvinyl alcohols is 1,000 or more, the resulting coating can be prevented from cracking and when it is 5,000 or less, a stable coating liquid can be formed. As used herein, the term "a stable coating liquid" means a coating liquid capable of remaining stable over time. Preferably, at least one of polyvinyl alcohols (A) and (B) has a degree of polymerization of 2,000 to 5,000, which makes it possible to reduce the cracking of the resulting coating and improve the reflectance at a specific wavelength. More preferably, both polyvinyl alcohols (A) and (B) have a degree of polymerization of 2,000 to 5,000, so that the above effects can be more significant.

As used herein, the term "degree P of polymerization (polymerization degree P)" refers to viscosity average degree of polymerization. The degree of polymerization can be determined according to JIS K 6726 (1994) by a process that includes completely re-saponifying PVA, purifying the saponified PVA, measuring its intrinsic viscosity [η] (dl/g) in water at 30° C., and calculating the degree of polymerization from the following formula (1).

$$P=([\eta]\times10^3/8.29)^{(1/0.62)} \quad \text{Formula (1)}$$

Polyvinyl alcohol (B) in the low refractive index layer preferably has a degree of saponification of 75 to 90 mol % and a degree of polymerization of 2,000 to 5,000. The addition of polyvinyl alcohol with such properties to the low refractive index layer is advantageous in that interface mixing can be reduced more effectively. This may be because the resulting coating can resist cracking and have improved setting properties.

Polyvinyl alcohols (A) and (B) for use in the present invention may be synthesized or obtained commercially. Examples of commercially available products that may be used as polyvinyl alcohols (A) and (B) include PVA-102, PVA-103, PVA-105, PVA-110, PVA-117, PVA-120, PVA-124, PVA-203, PVA-205, PVA-210, PVA-217, PVA-220, PVA-224, and PVA-235 (each manufactured by KURARAY CO., LTD.) and JC-25, JC-33, JF-03, JF-04, JF-05, JP-03, JP-04, JP-05, and JP-45 (each manufactured by JAPAN VAM & POVAL CO., LTD.).

In the present invention, the first water-soluble binder resin may contain a modified polyvinyl alcohol, which is obtained by partially modifying polyvinyl alcohol, in addition to normal polyvinyl alcohol obtained by hydrolysis of polyvinyl acetate, as long as the effects of the present invention are not impaired. The addition of such a modified polyvinyl alcohol may improve the adhesion, water resistance, or flexibility of the coating. Such a modified polyvinyl alcohol may be a cationic modified polyvinyl alcohol, an anionic modified polyvinyl alcohol, a nonionic modified polyvinyl alcohol, or a vinyl alcohol polymer.

The cationic modified polyvinyl alcohol is, for example, a polyvinyl alcohol having a primary, secondary, or tertiary amino group or a quaternary ammonium group in the main or side chain of the polyvinyl alcohol as described in JP 61-10483 A, which can be obtained by saponifying a copolymer of a cationic group-containing ethylenically unsaturated monomer and vinyl acetate.

Examples of the cationic group-containing ethylenically unsaturated monomer include trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxyethyltrimethylammonium chloride, trimethyl-(2-methacrylamidopropyl)ammonium chloride, and N-(1,1-dimethyl-3-dimethylaminopropyl)acrylamide. The content of the component derived from the cationic modifying group-containing monomer in the cationic modified polyvinyl alcohol may be 0.1 to 10 mol %, preferably 0.2 to 5 mol %, based on the amount of vinyl acetate.

Examples of the anionic modified polyvinyl alcohol include a polyvinyl alcohol having an anionic group as described in JP 01-206088 A, a copolymer of vinyl alcohol and a water-soluble group-containing vinyl compound as described in JP 61-237681 A and JP 63-307979 A, and a modified polyvinyl alcohol having a water-soluble group as described in JP 07-285265 A.

Examples of the nonionic modified polyvinyl alcohol include a polyvinyl alcohol derivative having a polyalkylene oxide group added to part of polyvinyl alcohol as described in JP 07-9758 A, a block copolymer of a hydrophobic group-containing vinyl compound and vinyl alcohol as described in JP 08-25795 A, a silanol-modified polyvinyl alcohol having a silanol group, and a reactive group-modified polyvinyl alcohol having a reactive group such as an acetoacetyl, carbonyl, or carboxy group.

The vinyl alcohol polymer may be, for example, Exceval (registered trademark) (manufactured by KURARAY CO., LTD.) or Nichigo G-Polymer (registered trademark) (manufactured by The Nippon Synthetic Chemical Industry Co., Ltd.).

Two or more modified polyvinyl alcohols with different degrees of polymerization or of different modification types may be used in combination.

The content of the modified polyvinyl alcohol is preferably, but not limited to, 1 to 30% by mass based on the total mass (on a solid basis) of each refractive index layer. In such a range, the above effects can be produced more effectively.

In the present invention, two polyvinyl alcohols with different degrees of saponification are preferably used in layers with different refractive indices, respectively.

For example, polyvinyl alcohol (A) with a low degree of saponification may be used in the high refractive index layer, and polyvinyl alcohol (B) with a high degree of saponification may be used in the low refractive index layer. In this case, the content of polyvinyl alcohol (A) in the high refractive index layer is preferably in the range of 40% by mass to 100% by mass, more preferably 60% by mass to 95% by mass, based on the total mass of all polyvinyl alcohols in the layer, and the content of polyvinyl alcohol (B) in the low refractive index layer is preferably in the range of 40% by mass to 100% by mass, more preferably 60% by mass to 95% by mass, based on the total mass of all polyvinyl alcohols in the low refractive index layer. Alternatively, polyvinyl alcohol (A) with a high degree of saponification may be used in the high refractive index layer, and polyvinyl alcohol (B) with a low degree of saponification may be used in the low refractive index layer. In this case, the content of polyvinyl alcohol (A) in the high refractive index layer is preferably in the range of 40% by mass to 100% by mass, more preferably 60% by mass to 95% by mass, based on the total mass of all polyvinyl alcohols in the layer, and the content of polyvinyl alcohol (B) in the low refractive index layer is preferably in the range of 40% by mass to 100% by mass, more preferably 60% by mass to 95% by mass, based on the total mass of all polyvinyl alcohols in the low refractive index layer. When the polyvinyl alcohol content is 40% by mass or more, the effect of suppressing interlayer mixing and reducing interface disturbance can be significantly produced. On the other hand, when the polyvinyl alcohol content is 100% by mass or less, the coating liquid can have improved stability.

(Other Binder Resins)

In the present invention, any additional binder resin other than polyvinyl alcohol may also be used as the first water-soluble binder resin in the high refractive index layer, as long as it can form a coating for the high refractive index layer containing the first metal oxide particles. Similarly, any additional binder resin other than polyvinyl alcohol may also be used as the second water-soluble binder resin in the low refractive index layer described below, as long as it can form a coating for the low refractive index layer containing the second metal oxide particles. Preferably, in view of environmental problems and coating flexibility, the additional binder resins other than polyvinyl alcohol are preferably water-soluble polymers (specifically, gelatin, thickening polysaccharides, or reactive functional group-containing polymers). Any of such water-soluble polymers may be used alone or in the form of a mixture of two or more.

In the high refractive index layer, the content of the additional water-soluble binder resin preferably used in combination with polyvinyl alcohol may be in the range of 5 to 50% by mass based on 100% by mass of the solids in the high refractive index layer.

In the present invention, the binder resin preferably includes a water-soluble polymer or polymers, which can eliminate the need for using organic solvents and thus is preferable in terms of environmental preservation. Specifically, in the present invention, a water-soluble polymer or polymers other than polyvinyl alcohol and modified polyvinyl alcohol may be used as the binder resin in addition to the polyvinyl alcohol and the modified polyvinyl alcohol as long as the effects of the present invention are not impaired. The water-soluble polymer is such that when it is dissolved at a concentration of 0.5% by mass in water at a temperature where it is most soluble and then the solution is filtered through a G2 glass filter (40 to 50 μm in maximum pore size), the mass of the insoluble material separated by the filtration is 50% by mass or less of it added. In particular, the water-soluble polymer is preferably any of gelatin, celluloses, thickening polysaccharides, or reactive group-containing polymers. Any of these water-soluble polymers may be used alone or in the form of a mixture of two or more.

(First Metal Oxide Particles)

In the present invention, the first metal oxide particles for use in the high refractive index layer are preferably metal oxide particles with a refractive index of 2.0 to 3.0. More specifically, examples of the metal oxide include titanium oxide, zirconium oxide, zinc oxide, alumina, colloidal alumina, lead titanate, red lead, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon, and tin oxide. Complex oxide particles including different metals or core-shell particles in which a metal or metals form a core-shell structure may also be used.

To have transparency and higher refractive index, the high refractive index layer preferably contains fine particles of an oxide of a high-refractive-index metal such as titanium or zirconium, specifically, titanium oxide fine particles and/or zirconium oxide fine particles. Among them, titanium oxide is more preferred in view of the stability of the coating liquid for forming the high refractive index layer. Specifically, rutile-type titanium oxide (tetragonal system) is more preferable than anatase-type titanium oxide because the former has lower catalytic activity, which makes it possible to improve the weather resistance of the high refractive index layer or the adjacent layer and to further increase the refractive index.

(Curing Agent)

In the present invention, a curing agent may also be used to cure the first water-soluble binder resin used in the high refractive index layer. For example, when polyvinyl alcohol is used as the first water-soluble binder resin, the curing agent is preferably any of boric acid and a salt thereof. Examples of the curing agent also include epoxy curing agents (such as diglycidyl ethyl ether, ethylene glycol diglycidyl ether, 1,4-butanediol diglycidyl ether, 1,6-diglycidyl-cyclohexane, N,N-diglycidyl-4-glycidyloxyaniline, sorbitol polyglycidyl ether, and glycerol polyglycidyl ether), aldehyde curing agents (such as formaldehyde and glyoxal), active halide curing agents (such as 2,4-dichloro-4-hydroxy-1,3,5-s-triazine), active vinyl compounds (such as 1,3,5-trisacryloyl-hexahydro-s-triazine and bisvinylsulfonylmethyl ether), and aluminum alum.

The content of the curing agent in the high refractive index layer is preferably 1 to 10% by mass, more preferably 2 to 6% by mass, based on 100% by mass of the solids in the high refractive index layer.

Particularly when polyvinyl alcohol is used as the first water-soluble binder resin, the total amount of the curing agent or agents used is preferably 1 to 600 mg per 1 g of polyvinyl alcohol, more preferably 100 to 600 mg per 1 g of polyvinyl alcohol.

[Low Refractive Index Layer]

In the present invention, the low refractive index layer includes a second water-soluble binder resin and second metal oxide particles and may further include a curing agent, a surface coating component, a particle surface protecting agent, a binder resin, a surfactant, and various additives.

In the present invention, the low refractive index layer preferably has a refractive index of 1.10 to 1.60, more preferably 1.30 to 1.50.

(Second Water-Soluble Binder Resin)

In the present invention, the second water-soluble binder resin for use in the low refractive index layer is preferably polyvinyl alcohol. More preferably, polyvinyl alcohol (B) with a degree of saponification different from that of polyvinyl alcohol (A) in the high refractive index layer is preferably used in the low refractive index layer according to the present invention. The preferred weight average molecular weight and other properties of the second water-soluble binder resin and polyvinyl alcohols (A) and (B) are described above for the water-soluble binder resin in the high refractive index layer. Therefore, a duplicate description thereof will be omitted herein.

The content of the second water-soluble binder resin in the low refractive index layer is preferably in the range of 20 to 99.9% by mass, more preferably in the range of 25 to 80% by mass, based on 100% by mass of the solids in the low refractive index layer.

In the low refractive index layer, the content of any additional second water-soluble binder resin preferably used in combination with polyvinyl alcohol may be in the range of 0 to 10% by mass based on 100% by mass of the solids in the low refractive index layer.

(Second Metal Oxide Particles)

In the present invention, the second metal oxide particles for use in the low refractive index layer preferably include silica (silicon dioxide), specific examples of which include synthetic amorphous silica and colloidal silica. Among them, acidic colloidal silica is more preferably used.

The second metal oxide particles (preferably silicon dioxide) for use in the low refractive index layer preferably have an average particle size of 3 to 100 nm. When dispersed in the form of primary particles, silicon dioxide particles preferably have an average particle size (the size of particles in a dispersion before application) of 3 to 50 nm, more preferably 3 to 40 nm, even more preferably 3 to 20 nm, most preferably 4 to 10 nm. On the other hand, secondary particles preferably have an average particle size of 30 nm or less, so that low haze and high visible light transparency can be achieved.

The average particle size of the metal oxide particles for use in the low refractive index layer can be determined as the simple average (number average) of the measured sizes of any 1,000 particles, which are observed directly with an electron microscope or observed on the cross-section or surface of the refractive index layer with an electron microscope. In this case, the size of each particle is represented by the diameter of a circle assumed to have an area equal to the projected area of the particle.

Colloidal silica for use in the present invention can be obtained by metathesis of sodium silicate with an acid or the like or by heating and aging silica sol obtained through an ion exchange resin layer. Examples thereof include those described in JP 57-14091 A, JP 60-219083 A, JP 60-219084 A, JP 61-20792 A, JP 61-188183 A, JP 63-17807 A, JP 04-93284 A, JP 05-278324 A, JP 06-92011 A, JP 06-183134 A, JP 06-297830 A, JP 07-81214 A, JP 07-101142 A, JP 07-179029 A, JP 07-137431 A, and WO 94/26530 A.

Such colloidal silica may be synthesized or obtained commercially. The colloidal silica may have a cation-modified surface or have undergone a treatment with Al, Ca, Mg, or Ba.

The second metal oxide particles for use in the low refractive index layer may also be hollow particles. Hollow particles for use as the second metal oxide particles preferably have an average pore size of 3 to 70 nm, more preferably 5 to 50 nm, even more preferably 5 to 45 nm. In this regard, the average pore size of hollow particles is the average of the inner diameters of the hollower particles. In the present invention, when the average pore size of the hollow particles falls within the above ranges, the low refractive index layer can a sufficiently low refractive index. The average pore size can be determined by a process that includes observing, with an electron microscope, randomly selected 50 or more pores, which can be observed as circles, ellipses, or substantially circular or elliptical shapes, determining the pore diameter of each particle, and calculating the number average of the pore diameters. In this regard, the average pore size means the minimum among the distances between all possible pairs of two parallel lines between which the surrounding edge of pores are sandwiched, wherein the pores can be observed as circles, ellipses, or substantially circular or elliptical shapes.

The content of the second metal oxide particles in the low refractive index layer is preferably 0.1 to 70% by mass, more preferably 30 to 70% by mass, even more preferably 45 to 65% by mass, based on 100% by mass of the solids in the low refractive index layer.

(Curing Agent)

In the present invention, the low refractive index layer may further contain a curing agent like the high refractive index layer. The curing agent may be of any type capable of undergoing a curing reaction with the second water-soluble binder resin in the low refractive index layer. Particularly when polyvinyl alcohol is used as the second water-soluble binder resin in the low refractive index layer, the curing agent is preferably boric acid, a salt thereof, and/or borax. Known curing agents other than boric acid and salts thereof may also be used.

The content of the curing agent in the low refractive index layer is preferably in the range of 1 to 10% by mass, more preferably in the range of 2 to 6% by mass, based on 100% by mass of the solids in the low refractive index layer.

Examples and other features of the curing agent may be the same as those described above for the high refractive index layer. Therefore, a duplicate description thereof will be omitted herein.

(Other Additives for Each Refractive Index Layer)

In the present invention, if necessary, the high and low refractive index layers may contain any of various additives. The content of the additive in the high refractive index layer is preferably 0 to 20% by mass based on 100% by mass of the solids in the high refractive index layer. Examples of the additive include surfactants, amino acids, emulsion resins, and lithium compounds described in paragraphs [0140] to

[0154] of JP 2012-139948 A, and other additives described in paragraph [0155] of JP 2012-139948 A.

[Method for Forming a Group of Near-infrared Reflecting Layers]

A method for forming the near-infrared reflecting layer for use in the present invention preferably includes forming the near-infrared reflecting layer using a wet coating method, and more preferably includes the step of applying a high refractive index layer-forming coating liquid and a low refractive index layer-forming coating liquid to the transparent substrate by wet coating, wherein the high refractive index layer-forming coating liquid contains the first water-soluble binder resin and the first metal oxide particles, and the low refractive index layer-forming coating liquid contains the second water-soluble binder resin and the second metal oxide particles.

The wet coating method may be, for example, but not limited to, roll coating, rod bar coating, air knife coating, spray coating, slide curtain coating, slide hopper coating such as that descried in U.S. Pat. Nos. 2,761,419 or 2,761,791, or extrusion coating. The method for overlaying a plurality of layers may be sequential multilayer coating or simultaneous multilayer coating.

Hereinafter, simultaneous multilayer coating by slide hopper coating will be described in detail as a preferred process (coating method) used in the present invention.

(Solvent)

A solvent is used to form the high refractive index layer-forming coating liquid and the low refractive index layer-forming coating liquid. Such a solvent is preferably, but not limited to, water, an organic solvent, or a mixed solvent of water and an organic solvent.

Examples of the organic solvent include alcohols such as methanol, ethanol, 2-propanol, and 1-butanol; esters such as ethyl acetate, butyl acetate, propylene glycol monomethyl ether acetate, and propylene glycol monoethyl ether acetate; ethers such as diethyl ether, propylene glycol monomethyl ether, and ethylene glycol monoethyl ether; amides such as dimethylformamide and N-methylpyrrolidone; and ketones such as acetone, methyl ethyl ketone, acetyl acetone, and cyclohexanone. Any of these organic solvents may be used alone or in the form of a mixture of two or more.

In view of environmental aspects, easy handling, and other factors, water or a mixed solvent of water and methanol, ethanol, or ethyl acetate is particularly preferred as the solvent for the coating liquid.

(Concentration of Coating Liquid)

The concentration of the water-soluble binder resin in the high refractive index layer-forming coating liquid is preferably in the range of 1 to 10% by mass. The concentration of the metal oxide particles in the high refractive index layer-forming coating liquid is preferably in the range of 1 to 50% by mass.

The concentration of the water-soluble binder resin in the low refractive index layer-forming coating liquid is preferably in the range of 1 to 10% by mass. The concentration of the metal oxide particles in the low refractive index layer-forming coating liquid is preferably in the range of 1 to 50% by mass.

(Method for Preparing the Coating Liquid)

A non-limiting method for preparing the high refractive index layer-forming coating liquid and the low refractive index layer-forming coating liquid includes, for example, adding the water-soluble binder resin, the metal oxide particles, and optionally additional additives to the solvent and mixing and stirring them. In this process, the water-soluble binder resin, the metal oxide particles, and the optional additives may be added in any order. The respective components may be sequentially added and mixed with stirring, or all the components may be added at a time and mixed with stirring. If necessary, the solvent may be further used to adjust the viscosity to a suitable level.

(Viscosity of Coating Liquid and Slit Width)

In the process of performing simultaneous multilayer coating by slide hopper coating, the low refractive index layer-forming coating liquid preferably has a viscosity of 100 to 300 mPa·s, more preferably 180 to 250 mPa·s, at 36° C., in order to improve the uniformity of the coating. In the same process, the high refractive index layer-forming coating liquid preferably has a viscosity of 10 to 50 mPa·s, more preferably 15 to 35 mPa·s, at 36° C.

Also in the process of performing simultaneous multilayer coating by slide hopper coating, the slit width of the coater is preferably in the range of 100 to 400 μm, more preferably in the range of 200 to 350 μm, when the low refractive index layer-forming coating liquid is cast. When the high refractive index layer-forming coating liquid is cast in the same process, the slit width of the coater is preferably in the range of 100 to 300 μm, more preferably in the range of 180 to 250 μm.

(Coating and Drying Method)

As a non-limiting example, the coating and drying method preferably includes heating the high refractive index layer-forming coating liquid and the low refractive index layer-forming coating liquid at 30° C. or higher, applying the heated high refractive index layer-forming coating liquid and the heated low refractive index layer-forming coating liquid to the substrate by simultaneous multilayer coating, then temporarily cooling (setting) the resulting coating preferably to 1 to 15° C., and then drying the coating at 10° C. or higher. The drying conditions more preferably include a wet-bulb temperature of 5 to 50° C. and a coating surface temperature of 10 to 50° C. Immediately after the application, the cooling is preferably performed under horizontal setting conditions in order to improve the uniformity of the resulting coating.

The high refractive index layer-forming coating liquid is preferably applied with such a thickness that each resulting high refractive index layer has a thickness of 20 to 800 nm, more preferably 50 to 350 nm. The low refractive index layer-forming coating liquid is preferably applied with such a thickness that each resulting low refractive index layer has a thickness of 20 to 800 nm, more preferably 50 to 350 nm.

When the thickness of each resulting layer is measured, there may be a clear interface or a gradual change between the high and low refractive index layers. When there is a gradual change at the interface in a region where the two layers form a mixture having a continuously varying refractive index, the position with the refractive index equal to the minimum refractive index+Δn/2 between the two layers is assumed as the interface between the layers, in which Δn=the maximum refractive index—the minimum refractive index.

The thickness of the lowermost layer (preferably, the low refractive index layer) in contact with the transparent substrate is preferably controlled in order to improve the adhesion and smoothness of the coating. After the drying, the coating preferably has a thickness of 400 to 1,500 nm, more preferably 950 to 1,500 nm. In the practical coating process, the flow rate of the coating liquid may be so controlled that the above preferred dry thickness can be achieved.

As used herein, the term "setting" means the step of increasing the viscosity of the coating composition and reducing the fluidity of the material between and in the respective layers by a certain method such as blowing cold air or the like on the coating to lower the temperature. The state of completion of setting is defined as the state in which nothing sticks to fingers when the fingers are pressed against the surface of the coating with cold air being blown on the surface of the coating.

After the application, the time (setting time) from the start of blowing cold air to the completion of setting is preferably 5 minutes or less, more preferably 2 minutes or less. The lower limit of the setting time is preferably, but not limited to, 45 seconds or more. If the setting time is too short, the components in the layer may be insufficiently mixed. On the other hand, if the setting time is too long, the interlayer diffusion of the metal oxide particles may proceed, so that the refractive index difference between the high and low refractive index layers may be insufficient. The setting step may be omitted if the heat ray-shielding film unit of the high and low refractive index layers quickly becomes highly elastic.

The setting time can be controlled by controlling the concentration of the water-soluble binder resin and the concentration of the metal oxide particles and by adding an additional material such as any of various known gelling agents including gelatin, pectin, agar, carrageenan, and gellan gum.

The temperature of the cold air is preferably 0 to 25° C., more preferably 5 to 10° C. The time for which the coating is exposed to the cold air is preferably 10 to 120 seconds, although it depends on the coating feed rate.

Figure 2:
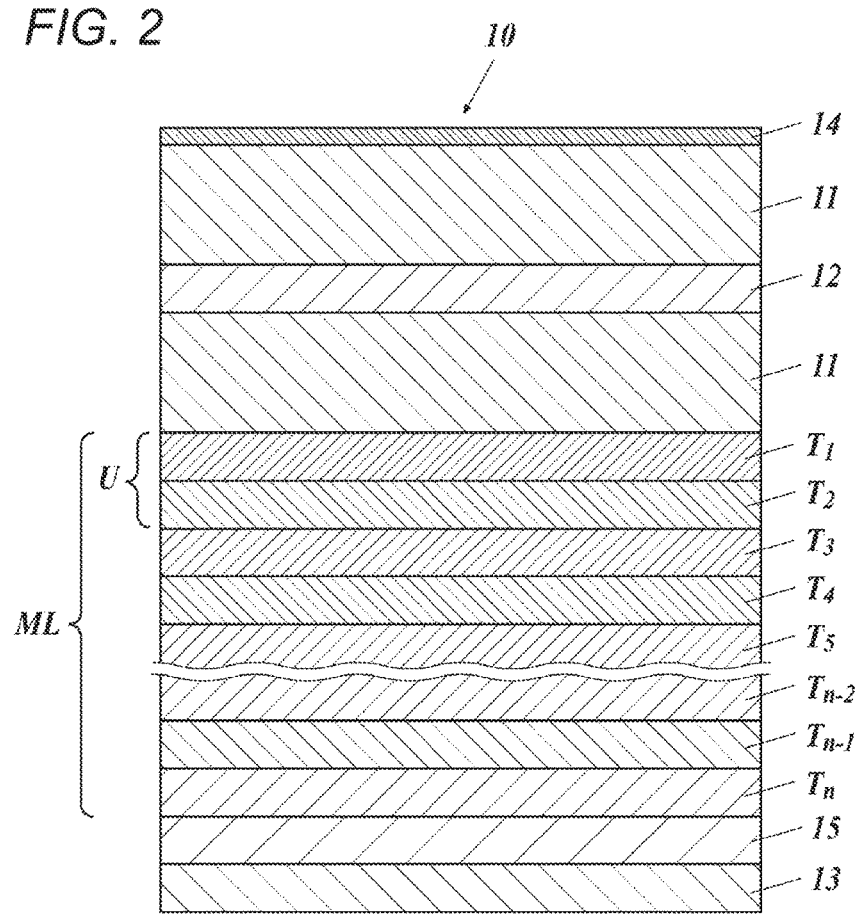
FIG. 2 is a schematic cross-sectional view illustrating the structure of a near-infrared shielding film according to the present invention having a reflecting layer unit including a group of near-infrared reflecting layers.

FIG. 2 is a schematic cross-sectional view illustrating the structure of an example of the near-infrared shielding film of the present invention, which has a multilayer film including a group of near-infrared reflecting layers provided on one surface of the transparent substrate.

The near-infrared shielding film 10 of the present invention shown in FIG. 2 has a reflecting layer unit U.

As an example, the reflecting layer unit U has a reflecting layer group ML including alternately stacked reflecting layers with high and low refractive indices on one surface of the transparent substrate 11, in which each reflecting layer with a high refractive index includes the first water-soluble binder resin and the first metal oxide particles, and each reflecting layer with a low refractive index includes the second water-soluble binder resin and the second metal oxide particles. The reflecting layer group ML is composed of reflecting layers $T_1$ to $T_n$ (n layers), in which, for example, the layers $T_1, T_3, T_5, \ldots, T_{n-2}$, and $T_n$ are low refractive index layers with a refractive index of 1.10 to 1.60, and the layers $T_2, T_4, T_6, \ldots,$ and $T_{n-1}$ are high refractive index layers with a refractive index of 1.80 to 2.50. In the context of the present invention, the refractive index is the value measured in an environment at 25° C.

In addition, another pressure-sensitive adhesive layer 15 and a release layer 13 for protecting the pressure-sensitive adhesive layer 15 are preferably provided on the outermost layer of the reflecting layer unit. A hard coat layer 14 for improving scratch resistance is also preferably provided on the surface of the transparent substrate 11 opposite to its surface on which the reflecting layer unit is provided. The hard coat layer 14 is provided on the substrate 11 with a pressure-sensitive adhesive layer 12 and another transparent substrate 11 interposed between the hard coat layer 14 and the substrate 11. The pressure-sensitive adhesive layer 12 has the near-infrared shielding effect according to the present invention.

[5.2] Hard Coat Layer

The hard coat layer for use in the present invention preferably has a pencil hardness of H to 8H, more preferably 2H to 6H. The pencil hardness is the value measured by the pencil hardness evaluation method provided in JIS K 5400 using a test pencil according to JIS S 6006 after the near-infrared shielding film with the hard coat layer disposed on the outermost surface is subjected to humidity control under the conditions of a temperature of 25° C. and a relative humidity of 60% for 2 hours. The hard coat layer with a pencil hardness in the above range allows the heat shield film to have scratch resistance. The hard coat layer may be disposed at any position in the near-infrared shielding film of the present invention. In order to impart scratch resistance, the hard coat layer is preferably disposed on at least one outermost surface of the near-infrared shielding film.

Examples of materials that can be used to form the hard coat layer include organic hard coat materials such as silicone compounds, melamine compounds, epoxy compounds, acrylate compounds, and polyfunctional (meth)acrylic compounds; and inorganic hard coat materials such as silicon dioxide. In particular, (meth)acrylate-based hard coating materials and polyfunctional (meth)acrylic compound-based hard coating materials are preferably used because they have good adhesive strength and are highly producible. In this context, the term "(meth)acryl" means acryl and methacryl.

In order to have high scratch resistance, the hard coat layer is preferably made from a resin composition composed mainly of a resin capable of being cured through a cross-linking reaction. Such a resin is preferably an active energy ray-curable resin.

An ultraviolet-curable resin is preferably used as the active energy ray-curable resin. The ultraviolet-curable resin to be used may be appropriately selected from, but not limited to, ADEKA OPTOMER KR and BY Series such as KR-400, KR-410, KR-550, KR-566, KR-567, and BY-320B (each manufactured by ADEKA CORPORATION), KOEI-HARD A-101-KK, A-101-WS, C-302, C-401-N, C-501, M-101, M-102, T-102, D-102, NS-101, FT-102Q8, MAG-1-P20, AG-106, and M-101-C (each manufactured by KOEI CHEMICAL CO., LTD.), SEIKABEAM PHC2210(S), PHCX-9(K-3), PHC2213, DP-10, DP-20, DP-30, P1000, P1100, P1200, P1300, P1400, P1500, P1600, and SCR900 (each manufactured by Dainichiseika Color & Chemicals Mfg. Co., Ltd.), KRM7033, KRM7039, KRM7130, KRM7131, UVECRYL29201, and UVECRYL29202 (each manufactured by Daicel-UCB Co. Ltd.), RC-5015, RC-5016, RC-5020, RC-5031, RC-5100, RC-5102, RC-5120, RC-5122, RC-5152, RC-5171, RC-5180, and RC-5181 (each manufactured by DIC Corporation), OLEX No. 340 CLEAR (manufactured by CHUGOKU MARINE PAINTS, LTD.); SANRAD H-601R (manufactured by Sanyo Chemical Industries, Ltd.); SP-1509 and SP-1507 (each manufactured by SHOWA HIGHPOLYMER CO., LTD.), RCC-15C (manufactured by Grace Japan K.K), ARONIX M-6100, M-8030, and M-8060 (each manufactured by TOAGOSEI CO., LTD.), or other commercially available products.

Inorganic or organic fine particles may also be added to the hard coat layer-forming coating composition so that the resulting hard coat layer can have antiglare properties, be prevented from sticking to other materials, and have improved scratch resistance and other properties. The fine particles preferably have a volume average particle size of 0.01 to 10 μm, and are preferably used in an amount of 0.1 to 20 parts by mass based on 100 parts by mass of the active energy-ray curable resin. To impart antiglare properties, 1 to 15 parts by mass of the fine particles with an average particle size of 0.1 to 1 µm are preferably added to 100 parts by mass of the active energy ray-curable resin.

An antioxidant not inhibitory to the photo-curing reaction may be selected and used to improve the heat resistance of the hard coat layer. Examples of such an antioxidant include hindered phenol derivatives, thiopropionic acid derivatives, and phosphite derivatives. Specific examples include 4,4'-thiobis(6-tert-3-methylphenol), 4,4'-butylidenebis(6-tert-butyl-3-methylphenol), 1,3,5-tris(3,5-di-tert-butyl-4-hydroxybenzyl)isocyanurate, 2,4,6-tris(3,5-di-tert-butyl-4-hydroxybenzyl)mesitylene, and di-octadecyl-4-hydroxy-3,5-di-tert-butylbenzyl phosphate. The hard coat layer-forming coating liquid may contain a solvent. If necessary, the hard coat layer-forming coating liquid may contain or be diluted with a solvent. Examples of organic solvents that can be contained in the layer-forming coating liquid include hydrocarbons (toluene and xylene), alcohols (methanol, ethanol, isopropanol, butanol, and cyclohexanol), ketones (acetone, methyl ethyl ketone, and methyl isobutyl ketone), esters (methyl acetate, ethyl acetate, and methyl lactate), glycol ethers, and other organic solvents, any of which may be appropriately selected or mixed, and used. The organic solvent to be used preferably contains 5% by mass or more, more preferably 5 to 80% by mass of propylene glycol monoalkyl ether (with an alkyl group of 1 to 4 carbon atoms) or propylene glycol monoalkyl ether acetate (with an alkyl group of 1 to 4 carbon atoms).

The hard coat layer preferably has a centerline average surface roughness Ra of less than 0.05 µm, more preferably 0.002 to 0.04 µm according to JIS B 0601, which is preferred in order to form a hard coat layer with a highly smooth surface.

The centerline average roughness (Ra) can be measured with an optical interference-type surface roughness meter, such as a non-contact micro-surface profiler WYKO NT-2000 manufactured by WYKO Corporation.

The hard coat layer can be formed by, for example, applying the hard coat layer-forming coating liquid to the substrate and then applying active rays to the coating during or after drying, in which the hard coat layer-forming coating liquid is an organic solvent solution of an active energy ray-curable resin composition obtained by mixing the active energy ray-curable resin and other additives or additional materials. The hard coat layer-forming coating liquid may be applied by any known method such as a method using a gravure coater, a dip coater, a reverse coater, a wire bar coater, or a die coater, or an inkjet method. Using such a coating method, the coating liquid is preferably applied to form a wet coating with a thickness of 0.1 to 100 µm on one surface of the substrate.

The hard coat layer-forming coating liquid preferably has a solid concentration of 10 to 95% by mass, and an appropriate concentration is selected depending on the coating method.

Any light source capable of emitting ultraviolet rays may be used when the hard coat layer is formed by photo-curing reaction of the ultraviolet-curable resin. Examples that can be used include low-pressure mercury lamps, medium-pressure mercury lamps, high-pressure mercury lamps, extra-high pressure mercury lamps, carbon arc lamps, metal halide lamps, and xenon lamps. Specifically, commercially available lamps such as H, D, and V lamps manufactured by Fusion UV Systems Inc. may be used when the hard coat layer is formed. Although the irradiation conditions vary with the lamp type, the irradiation dose may be in the range of 20 to 1,200 mJ/cm$^2$, preferably in the range of 50 to 1,000 mJ/cm$^2$. A sensitizer having an absorption maximum in the near-ultraviolet to visible region may also be used.

The hard coat layer may have an average dry thickness of 0.1 to 30 µm, preferably 1 to 20 µm. In view of flexibility and economy, a dry thickness of 15 µm or less is particularly preferred. The hard coat layer may be a single layer or have a multilayer structure of two or more layers.

[5.3] Release Layer (Separator or Release Sheet)

For example, when the near-infrared shielding film of the present invention is for use as a window film, a release sheet (also called a separator) is preferably provided on the surface of the pressure-sensitive adhesive layer before the film is used.

The release sheet may be of any type capable of protecting the adhesive properties of the pressure-sensitive adhesive, such as an acrylic film or sheet, a polycarbonate film or sheet, a polyarylate film or sheet, a polyethylene naphthalate film or sheet, a polyethylene terephthalate film or sheet, a fluororesin film or sheet, or any other plastic film or sheet, a resin film or sheet containing titanium oxide, silica, aluminum powder, copper powder, or other materials incorporated by kneading, or a resin film or sheet having a release coating on the resin film or sheet containing titanium oxide, silica, aluminum powder, copper powder, or other materials incorporated by kneading.

In general, the thickness of the release sheet is preferably, but not limited to, 12 to 250 µm.

EXAMPLES

Hereinafter, the present invention will be more specifically described with reference to examples, which, however, are not intended to limit the present invention. Unless otherwise specified, the term "parts" or "%" used in the examples means "parts by mass" or "% by mass."

Example 1

[Preparation of Near-infrared Shielding Film 101]

The near-infrared shielding film illustrated in FIG. 1 was prepared by the procedure described below.

[Formation of Hard Coat Layer]

A 50-µm-thick polyethylene terephthalate film (COSMOSHINE A4300 manufactured by TOYOBO CO., LTD., with both sides having undergone adhesion facilitating treatment, abbreviated as PET) was used as a transparent substrate.

Using a gravure coater, UV-3701 (manufactured by TOAGOSEI CO., LTD.) was applied to the transparent substrate and then dried at a temperature of 90° C. Using a high-pressure mercury lamp, the coating layer was then cured at a total dose of 300 mJ/cm$^2$ to form a hard coat layer with a dry thickness of 2 µm.

[Formation of Pressure-sensitive Adhesive Layer]

In the description below, resins A, B, and C according to the present invention will be called hydroxyl-type, carboxyl-type, and hydroxyl/carboxyl-type resins, respectively.

A hydroxyl-type acrylic pressure-sensitive adhesive resin (6LQ-002 manufactured by Taisei Fine Chemical Co., Ltd., solid content 51.0%, acid value less than 0.5 mgKOH/g, hydroxy value 9 mgKOH/g) and a carboxyl-type acrylic pressure-sensitive adhesive resin (SK2094 (trade name) manufactured by Soken Chemical & Engineering Co., Ltd. (acrylic pressure-sensitive adhesive resin with an acid value of 6.8)) were added to YMF-02A (CWO manufactured by Sumitomo Metal Mining Co., Ltd. (a $Cs_{0.33}WO_3$ dispersion with a solid content of 28.5%)). The hydroxyl-type acrylic pressure-sensitive adhesive resin, the carboxyl-type acrylic pressure-sensitive adhesive resin, and the CWO dispersion were mixed in a ratio of 50:50:10 (solid to solid ratio). Pressure-sensitive adhesive layer-forming coating liquid 1 was obtained by mixing the resulting mixture with TINUVIN 477 (solid content 80%) as a UV absorber manufactured by BASF Japan Ltd. and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

In addition, using a die coater, pressure-sensitive adhesive layer-forming coating liquid 1 prepared as described above was applied to the release-treated surface of a separator (NS-23MA manufactured by Nakamoto Packs Co., Ltd.) and dried at 80° C. for 1 minute. Subsequently, the surface of the resulting pressure-sensitive adhesive layer was bonded to the surface of the PET film opposite to its surface on which the hard coat layer was formed, so that near-infrared shielding film 101 was obtained. The pressure-sensitive adhesive layer had a thickness of 10 μm.

Near-infrared shielding film 101 prepared by the procedure described above includes the transparent substrate; the hard coat layer provided on one surface of the transparent substrate; the pressure-sensitive adhesive layer provided on the other surface of the transparent substrate and including $Cs_{0.33}WO_3$ and the acrylic pressure-sensitive adhesive resins; and the separator film provided on the pressure-sensitive adhesive layer.

[Preparation of Near-infrared Shielding Films 102 to 123]

Near-infrared shielding films 102 to 123 were prepared similarly to the preparation of near-infrared shielding film 101, except that the types of resins classified into resins A, B, and C according to the present invention were changed, respectively, as shown in Table 1.

[Preparation of Near-infrared Shielding Film 102]

Near-infrared shielding film 102 was prepared using the same procedure as in the preparation of near-infrared shielding film 101, except that an acrylate copolymer (weight average molecular weight 650,000, acid value less than 0.5 mgKOH/g, hydroxy value 16 mgKOH/g) obtained by copolymerization of ethyl acrylate (EA), ethylhexyl acrylate (EHA), 2-hydroxyethyl acrylate (HEA), and acrylic acid (AA) in a mass ratio of EA:2EHA:HEA:AA of 37.85:60: 0.1:2.05 was used instead as the hydroxyl-type acrylic pressure-sensitive adhesive resin.

(Synthesis of Acrylic Copolymer 1)

Under a nitrogen gas stream, 37.85 parts of ethyl acrylate, 60 parts of ethylhexyl acrylate, 0.1 parts of 2-hydroxyethyl acrylate, 2.05 parts of acrylic acid, 400 parts of ethyl acetate, and 3 parts of α,α'-azobisisobutyronitrile were added to a three-necked flask and then allowed to react in an oil bath at 80° C. for 6 hours in the nitrogen gas stream. Subsequently, the reaction mixture was refluxed at the boiling point of ethyl acetate for 1 hour to give acrylic copolymer 1. Acrylic copolymer 1 (in a solution with a solid content of 20%) had a weight average molecular weight of about 650,000 as measured using GPC.

[Preparation of Near-infrared Shielding Film 103]

Near-infrared shielding film 103 was prepared using the same procedure as in the preparation of near-infrared shielding film 101, except that an acrylate copolymer (weight average molecular weight 700,000, acid value less than 0.5 mgKOH/g, hydroxy value 55 mgKOH/g) obtained by copolymerization of ethyl acrylate (EA), 2-hydroxyethyl acrylate (HEA), butyl acrylate (BA), and acrylic acid (AA) in a mass ratio of EA:BA:HEA:AA of 12.85:80:0.1:7.05 was used instead as the hydroxyl-type acrylic pressure-sensitive adhesive resin.

[Preparation of Near-infrared Shielding Film 104]

Near-infrared shielding film 104 was prepared using the same procedure as in the preparation of near-infrared shielding film 101, except that an acrylate copolymer (weight average molecular weight 550,000, acid value 55 mgKOH/ g) obtained by copolymerization of EA, BA, and AA in a mass ratio of 32.94:60:7.06 was used instead as the carboxyl-type acrylic pressure-sensitive adhesive resin.

[Preparation of Near-infrared Shielding Film 105]

Near-infrared shielding film 105 was prepared using the same procedure as in the preparation of near-infrared shielding film 101, except that an acrylate copolymer (weight average molecular weight 750,000, acid value 2 mgKOH/g) obtained by copolymerization of EA, 2EHA, and AA in a mass ratio of 39.74:60:0.26 was used instead as the carboxyl-type acrylic pressure-sensitive adhesive resin.

[Preparation of Near-infrared Shielding Film 106]

Near-infrared shielding film 106 was prepared using the same procedure as in the preparation of near-infrared shielding film 101, except that an acrylate copolymer (weight average molecular weight 650,000, acid value 1 mgKOH/g, hydroxy value 9 mgKOH/g) obtained by copolymerization of EA, BA, 2HEA, and AA in a mass ratio of 18.65:80:0.2: 1.15 was used instead as the hydroxyl-type acrylic pressure-sensitive adhesive resin.

[Preparation of Near-infrared Shielding Film 107]

Near-infrared shielding film 107 was prepared using the same procedure as in the preparation of near-infrared shielding film 101, except that an acrylate copolymer (weight average molecular weight 650,000, acid value 0 mgKOH/g, hydroxy value less than 0.5 mgKOH/g) obtained by copolymerization of EA, BA, 2HEA, and MA in a mass ratio of 34.9:60:0.1:5 was used instead as the hydroxyl-type acrylic pressure-sensitive adhesive resin.

[Preparation of Near-infrared Shielding Film 108]

Near-infrared shielding film 108 was prepared using the same procedure as in the preparation of near-infrared shielding film 101, except that an acrylate copolymer (weight average molecular weight 630,000, acid value less than 0.5 mgKOH/g, hydroxy value 75 mgKOH/g) obtained by copolymerization of EA, BA, 2HEA, and AA in a mass ratio of 30.27:60:0.1:9.63 was used instead as the hydroxyl-type acrylic pressure-sensitive adhesive resin.

[Preparation of Near-infrared Shielding Film 109]

Near-infrared shielding film 109 was prepared using the same procedure as in the preparation of near-infrared shielding film 101, except that an acrylate copolymer (weight average molecular weight 550,000, acid value less than 1 mgKOH/g) obtained by copolymerization of EA, 2EHA, and AA in a mass ratio of 39.9:60:0.1 was used instead as the carboxyl-type acrylic pressure-sensitive adhesive resin.

[Preparation of Near-infrared Shielding Film 110]

Near-infrared shielding film 110 was prepared using the same procedure as in the preparation of near-infrared shielding film 101, except that an acrylate copolymer (weight average molecular weight 500,000, acid value 75 mgKOH/ g) obtained by copolymerization of EA, 2EHA, and AA in a mass ratio of 30.37:60:9.63 was used instead as the carboxyl-type acrylic pressure-sensitive adhesive resin.

[Preparation of Near-infrared Shielding Film 111]

Near-infrared shielding film 111 containing no CWO was prepared using the same procedure as in the preparation of near-infrared shielding film 101, except that an acrylate copolymer (weight average molecular weight 650,000, acid value less than 0.5 mgKOH/g, hydroxy value 16 mgKOH/g) obtained as a hydroxyl-type acrylic pressure-sensitive adhesive resin by copolymerization of EA, 2EHA, HEA, and AA in a mass ratio of 37.85:60:0.1:2.05 and a carboxyl-type acrylic pressure-sensitive adhesive resin (SK2094 (trade name) manufactured by Soken Chemical & Engineering Co., Ltd. (acrylic pressure-sensitive adhesive resin with an acid value of 6.8)) were mixed in a ratio of 50:50 (solid to solid ratio) and that the pressure-sensitive adhesive layer-forming coating liquid used was obtained by mixing the resulting mixture with TINUVIN 477 as a UV absorber manufactured by BASF and an isocyanate crosslinking agent (CORONATE FIX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 112]

Near-infrared shielding film 112 was prepared using the same procedure as in the preparation of near-infrared shielding film 101, except that an acrylate copolymer (weight average molecular weight 700,000, acid value 8 mgKOH/g, hydroxy value 10 mgKOH/g) obtained by copolymerization of EA, 2EHA, 2HEA, and AA in a mass ratio of 37.07:60:1.65:1.28 was used instead as the hydroxyl/carboxyl-type acrylic pressure-sensitive adhesive resin.

[Preparation of Near-infrared Shielding Film 113]

Near-infrared shielding film 113 was prepared using the same procedure as in the preparation of near-infrared shielding film 101, except that an acrylate copolymer (weight average molecular weight 650,000, acid value less than 0.5 mgKOH/g, hydroxy value 16 mgKOH/g) obtained by copolymerization of EA, 2EHA, HEA, and AA in a mass ratio of 37.85:60:0.1:2.05 was used instead as the hydroxyl-type acrylic pressure-sensitive adhesive resin and that an acrylate copolymer (weight average molecular weight 700,000, acid value 8 mgKOH/g, hydroxy value 10 mgKOH/g) obtained by copolymerization of EA, 2EHA, 2HEA, and AA in a mass ratio of 37.07:60:1.65:1.28 was used instead as the hydroxyl/carboxyl-type acrylic pressure-sensitive adhesive resin.

[Preparation of Near-infrared Shielding Film 114]

Near-infrared shielding film 114 was prepared using the same procedure as in the preparation of near-infrared shielding film 101, except that an acrylate copolymer (weight average molecular weight 700,000, acid value less than 0.5 mgKOH/g, hydroxy value 55 mgKOH/g) obtained by copolymerization of EA, 2EHA, HEA, and AA in a mass ratio of 12.85:80:0.1:7.05 was used instead as the hydroxyl-type acrylic pressure-sensitive adhesive resin and that an acrylate copolymer (weight average molecular weight 700,000, acid value 8 mgKOH/g, hydroxy value 10 mgKOH/g) obtained by copolymerization of EA, 2EHA, 2HEA, and AA in a mass ratio of 37.07:60:1.65:1.28 was used instead as the hydroxyl/carboxyl-type acrylic pressure-sensitive adhesive resin.

[Preparation of Near-infrared Shielding Film 115]

Near-infrared shielding film 115 was prepared using the same procedure as in the preparation of near-infrared shielding film 101, except that an acrylate copolymer (weight average molecular weight 700,000, acid value less than 0.5 mgKOH/g, hydroxy value 16 mgKOH/g) obtained by copolymerization of EA, 2EHA, HEA, and AA in a mass ratio of 12.85:80:0.1:7.05 was used instead as the hydroxyl-type acrylic pressure-sensitive adhesive resin and that an acrylate copolymer (weight average molecular weight 700,000, acid value 8 mgKOH/g, hydroxy value 5 mgKOH/g) obtained by copolymerization of EA, 2EHA, 2HEA, and AA in a mass ratio of 37.71:60:1.65:0.64 was used instead as the hydroxyl/carboxyl-type acrylic pressure-sensitive adhesive resin.

[Preparation of Near-infrared Shielding Film 116]

Near-infrared shielding film 116 was prepared using the same procedure as in the preparation of near-infrared shielding film 101, except that an acrylate copolymer (weight average molecular weight 700,000, acid value less than 0.5 mgKOH/g, hydroxy value 16 mgKOH/g) obtained by copolymerization of EA, 2EHA, HEA, and AA in a mass ratio of 12.85:80:0.1:7.05 was used instead as the hydroxyl-type acrylic pressure-sensitive adhesive resin and that an acrylate copolymer (weight average molecular weight 610,000, acid value 8 mgKOH/g, hydroxy value 55 mgKOH/g) obtained by copolymerization of EA, 2EHA, 2HEA, and AA in a mass ratio of 31.29:60:1.65:7.06 was used instead as the hydroxyl/carboxyl-type acrylic pressure-sensitive adhesive resin.

[Preparation of Near-infrared Shielding Film 117]

Near-infrared shielding film 117 was prepared using the same procedure as in the preparation of near-infrared shielding film 101, except that an acrylate copolymer (weight average molecular weight 650,000, acid value less than 0.5 mgKOH/g, hydroxy value 16 mgKOH/g) obtained as a hydroxyl-type acrylic pressure-sensitive adhesive resin by copolymerization of EA, 2EHA, HEA, and AA in a mass ratio of 37.85:60:0.1:2.05, a carboxyl-type acrylic pressure-sensitive adhesive resin (SK2094 (trade name) manufactured by Soken Chemical & Engineering Co., Ltd. (acrylic pressure-sensitive adhesive resin with an acid value of 6.8)), and an acrylate copolymer (weight average molecular weight 700,000, acid value 8 mgKOH/g, hydroxy value 10 mgKOH/g) obtained as a hydroxyl/carboxyl-type acrylic pressure-sensitive adhesive resin by copolymerization of EA, 2EHA, 2HEA, and AA in a mass ratio of 37.07:60:1.65:1.28 were mixed in a ratio of 50:25:25 (solid to solid ratio); the resulting mixture and YMF-02A (a CWO dispersion with a solid content of 28.5%, manufactured by Sumitomo Metal Mining Co., Ltd.) were mixed in a ratio of 100:10 (solid to solid ratio); the resulting mixture was mixed with TINUVIN 477 as a UV absorber manufactured by BASF and an isocyanate crosslinking agent (CORONATE HX manufactured by Nippon Polyurethane Industry Co., Ltd.) as a curing agent in such a manner that adhesive acrylic resins, the UV absorber, and the curing agent were mixed in a ratio of 100:5:0.16 (solid to solid ratio); and the resulting pressure-sensitive adhesive layer-forming coating liquid was used.

[Preparation of Near-infrared Shielding Film 118]

Near-infrared shielding film 118 was prepared using the same procedure as in the preparation of near-infrared shielding film 101, except that an acrylate copolymer (weight average molecular weight 650,000, acid value 1 mgKOH/g, hydroxy value 9 mgKOH/g) obtained by copolymerization of EA, BA, 2EHA, and AA in a mass ratio of 18.65:80:0.2:1.15 was used instead as the hydroxyl-type acrylic pressure-sensitive adhesive resin and that an acrylate copolymer (weight average molecular weight 700,000, acid value 8 mgKOH/g, hydroxy value 10 mgKOH/g) obtained by copolymerization of EA, 2EHA, 2HEA, and AA in a mass ratio of 37.07:60:1.65:1.28 was used instead as the hydroxyl/carboxyl-type acrylic pressure-sensitive adhesive resin.

[Preparation of Near-infrared Shielding Film 119]

Near-infrared shielding film 119 was prepared using the same procedure as in the preparation of near-infrared shielding film 101, except that an acrylate copolymer (weight average molecular weight 650,000, acid value less than 0.5 mgKOH/g, hydroxy value 0 mgKOH/g) obtained by copolymerization of EA, BA, 2HEA, and AA in a mass ratio of 34.9:60:0.1:5 was used instead as the hydroxyl-type acrylic pressure-sensitive adhesive resin and that an acrylate copolymer (weight average molecular weight 700,000, acid value 8 mgKOH/g, hydroxy value 10 mgKOH/g) obtained by copolymerization of EA, 2EHA, 2HEA, and AA in a mass ratio of 37.07:60:1.65:1.28 was used instead as the hydroxyl/carboxyl-type acrylic pressure-sensitive adhesive resin.

[Preparation of Near-infrared Shielding Film 120]

Near-infrared shielding film 120 was prepared using the same procedure as in the preparation of near-infrared shielding film 101, except that an acrylate copolymer (weight average molecular weight 630,000, acid value less than 0.5 mgKOH/g, hydroxy value 75 mgKOH/g) obtained by copolymerization of EA, BA, 2HEA, and AA in a mass ratio of 30.27:60:0.1:9.63 was used instead as the hydroxyl-type acrylic pressure-sensitive adhesive resin and that an acrylate copolymer (weight average molecular weight 700,000, acid value 8 mgKOH/g, hydroxy value 10 mgKOH/g) obtained by copolymerization of EA, 2EHA, 2HEA, and AA in a mass ratio of 37.07:60:1.65:1.28 was used instead as the hydroxyl/carboxyl-type acrylic pressure-sensitive adhesive resin.

[Preparation of Near-infrared Shielding Film 121]

Near-infrared shielding film 121 was prepared using the same procedure as in the preparation of near-infrared shielding film 101, except that an acrylate copolymer (weight average molecular weight 650,000, acid value less than 0.5 mgKOH/g, hydroxy value 16 mgKOH/g) obtained by copolymerization of EA, 2EHA, HEA, and AA in a mass ratio of 37.85:60:0.1:2.05 was used instead as the hydroxyl-type acrylic pressure-sensitive adhesive resin and that an acrylate copolymer (weight average molecular weight 800,000, acid value 8 mgKOH/g, hydroxy value 0.7 mgKOH/g) obtained by copolymerization of EA, 2EHA, 2HEA, and AA in a mass ratio of 38.26:60:1.65:0.09 was used instead as the hydroxyl/carboxyl-type acrylic pressure-sensitive adhesive resin.

[Preparation of Near-infrared Shielding Film 122]

Near-infrared shielding film 122 was prepared using the same procedure as in the preparation of near-infrared shielding film 101, except that an acrylate copolymer (weight average molecular weight 650,000, acid value less than 0.5 mgKOH/g, hydroxy value 16 mgKOH/g) obtained by copolymerization of EA, 2EHA, HEA, and AA in a mass ratio of 37.85:60:0.1:2.05 was used instead as the hydroxyl-type acrylic pressure-sensitive adhesive resin and that an acrylate copolymer (weight average molecular weight 600,000, acid value 8 mgKOH/g, hydroxy value 75 mgKOH/g) obtained by copolymerization of EA, 2EHA, 2HEA, and AA in a mass ratio of 28.72:60:1.65:9.63 was used instead as the hydroxyl/carboxyl-type acrylic pressure-sensitive adhesive resin.

[Preparation of Near-infrared Shielding Film 123]

Near-infrared shielding film 123 containing no CWO was prepared using the same procedure as in the preparation of near-infrared shielding film 101, except that an acrylate copolymer (weight average molecular weight 650,000, acid value less than 0.5 mgKOH/g, hydroxy value 16 mgKOH/g) obtained as a hydroxyl-type acrylic pressure-sensitive adhesive resin by copolymerization of EA, 2EHA, HEA, and AA in a mass ratio of 37.85:60:0.1:2.05 and an acrylate copolymer (weight average molecular weight 700,000, acid value 8 mgKOH/g, hydroxy value 10 mgKOH/g) obtained as a hydroxyl/carboxyl-type acrylic pressure-sensitive adhesive resin by copolymerization of EA, 2EHA, 2HEA, and AA in a mass ratio of 37.07:60:1.65:1.28 were mixed in a ratio of 50:50 (solid to solid ratio) and that the pressure-sensitive adhesive layer-forming coating liquid used was obtained by mixing the resulting mixture with TINUVIN 477 as a UV absorber manufactured by BASF and an isocyanate crosslinking agent (CORONATE FIX manufactured by Nippon Polyurethane Industry Co., Ltd.) as a curing agent in such a manner that the acrylic pressure-sensitive adhesive resins, the UV absorber, and the curing agent were mixed in a ratio of 100:5:0.16 (solid to solid ratio).

The acid values and the hydroxy values of the acrylic pressure-sensitive adhesive resins used were each measured on the basis of the method provided in JIS K 1557-1:2007.

<<Evaluation>>

Resulting near-infrared shielding films 101 to 123 were evaluated as described below.

(1) Initial Haze

The haze of each sample was measured in an environment at 23° C. and 55% RH according to the plastic product testing methods of industrial standards (JIS K 7136 and JIS K 7361) using NDH 7000 manufactured by NIPPON DENSHOKU INDUSTRIES CO., LTD.

(2) Haze after Light Resistance Test

Sunshine Weather Meter (abbreviated as SWOM in the table) equipped with a carbon arc lamp was used as an accelerated light-resistance testing machine. The haze of each sample was measured under the conditions shown above after the sample was irradiated at an intensity of 250 W/cm$^2$ at 40° C. and 50% RH for 2,000 hours using the testing machine.

(3) Haze after Weathering Test

The haze of each sample was measured under the conditions shown above after the sample was exposed to an environment at 60° C. and 90% RH for 1,000 hours.

Samples with a haze value of 1.2% or less are evaluated as superior.

(4) Evaluation of Discoloration

Evaluation of discoloration was performed, in which the color difference ΔE in the L*a*b* color space was calculated between the initial color of the sample and the color of the sample after the accelerated light resistance test in the section (2). Samples with a ΔE of less than 3.0 are evaluated as superior. Particularly when ΔE is less than 2.0, almost no color change can be observed.

The results of the evaluation described above are shown in Table 1 below.

TABLE 1

| Near-infrared shielding film No. | Resin A Acid value | Resin A Hydroxy value | Resin B Acid value | Resin C Acid value | Resin C Hydroxy value | Tungsten oxide fine particles or composite tungsten oxide fine particles D Solid ratio | Haze (%) Initial | Haze (%) 60° C.-SWOM 2000 hr | Haze (%) 90% RH 1000 hr | ΔE SWOM 2000 hr | Note |
|---|---|---|---|---|---|---|---|---|---|---|---|
| 101 | <0.5 | 9 | 6.8 | — | — | 10 | 0.5 | 0.6 | 0.9 | 1.6 | Invention |
| 102 | <0.5 | 16 | 6.8 | — | — | 10 | 0.6 | 0.6 | 0.6 | 1.5 | Invention |
| 103 | <0.5 | 55 | 6.8 | — | — | 10 | 0.5 | 0.8 | 0.8 | 2.3 | Invention |
| 104 | <0.5 | 16 | 55 | — | — | 10 | 0.6 | 1.0 | 1.2 | 2.2 | Invention |
| 105 | <0.5 | 16 | 2 | — | — | 10 | 0.8 | 0.8 | 0.8 | 2.8 | Invention |
| 106 | 1 | 9 | 6.8 | — | — | 10 | 3.0 | 2.1 | 13.0 | 6.4 | Comparative Example |
| 107 | <0.5 | 0.5 | 6.8 | — | — | 10 | 2.2 | 22.6 | 10.5 | 10.0 | Comparative Example |
| 108 | <0.5 | 75 | 6.8 | — | — | 10 | 1.5 | 5.0 | 11.0 | 4.5 | Comparative Example |
| 109 | <0.5 | 9 | <1 | — | — | 10 | 2.7 | 3.0 | 10.2 | 2.7 | Comparative Example |
| 110 | <0.5 | 9 | 75 | — | — | 10 | 1.2 | 14.2 | 29.0 | 3.9 | Comparative Example |
| 111 | <0.5 | 16 | 6.8 | — | — | — | 0.5 | 0.6 | 10.4 | 5.6 | Comparative Example |
| 112 | <0.5 | 9 | — | 8 | 10 | 10 | 0.5 | 1.2 | 0.9 | 1.6 | Invention |
| 113 | <0.5 | 16 | — | 8 | 10 | 10 | 0.6 | 0.6 | 0.7 | 1.5 | Invention |
| 114 | <0.5 | 55 | — | 8 | 10 | 10 | 0.5 | 1.1 | 1.2 | 2.3 | Invention |
| 115 | <0.5 | 16 | — | 8 | 5 | 10 | 0.8 | 0.8 | 1.0 | 1.5 | Invention |
| 116 | <0.5 | 16 | — | 8 | 55 | 10 | 0.7 | 1.2 | 1.0 | 1.9 | Invention |
| 117 | <0.5 | 16 | 6.8 | 8 | 10 | 10 | 0.5 | 0.6 | 0.7 | 1.5 | Invention |
| 118 | 1 | 9 | — | 8 | 10 | 10 | 2.4 | 4.5 | 11.0 | 3.4 | Comparative Example |
| 119 | <0.5 | 0 | — | 8 | 10 | 10 | 3.3 | 4.0 | 9.0 | 8.6 | Comparative Example |
| 120 | <0.5 | 75 | — | 8 | 10 | 10 | 2.2 | 5.0 | 8.9 | 5.2 | Comparative Example |
| 121 | <0.5 | 16 | — | 8 | 0.7 | 10 | 1.0 | 4.2 | 13.0 | 4.0 | Comparative Example |
| 122 | <0.5 | 16 | — | 8 | 75 | 10 | 1.1 | 3.6 | 19.0 | 5.0 | Comparative Example |
| 123 | <0.5 | 16 | — | 8 | 10 | — | 0.7 | 1.4 | 20.4 | 7.8 | Comparative Example |

* Acid and hydroxy values are in units of mgKOH/g.

Table 1 shows that the near-infrared shielding films according to the present invention are superior to those of the comparative examples with respect to the initial haze, the haze after the light resistance test, and the haze after the weathering test, and also showed less discoloration than those of the comparative examples.

Example 2

The near-infrared shielding films shown below were prepared similarly to Example 1.

[Preparation of Near-infrared Shielding Film 124]

A hydroxyl-type acrylic pressure-sensitive adhesive resin (6LQ-002 manufactured by Taisei Fine Chemical Co., Ltd., solid content 51.0%, acid value less than 0.5 mgKOH/g, hydroxy value 9 mgKOH/g) was added to YMF-02A (a CWO dispersion with a solid content of 28.5% manufactured by Sumitomo Metal Mining Co., Ltd.). After the materials were sufficiently stirred and mixed, a carboxyl-type acrylic pressure-sensitive adhesive resin (SK2094 (trade name) manufactured by Soken Chemical & Engineering Co., Ltd. (acrylic pressure-sensitive adhesive resin with an acid value of 6.8)) was added to the mixture and stirred. The hydroxyl-type acrylic pressure-sensitive adhesive resin, the carboxyl-type acrylic pressure-sensitive adhesive resin, and the CWO dispersion were mixed in a ratio of 50:50:10 (solid to solid ratio). Near-infrared shielding film 124 was further prepared using the same procedure as in the preparation of near-infrared shielding film 101, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 125]

An acrylate copolymer (weight average molecular weight 650,000, acid value less than 0.5 mgKOH/g, hydroxy value 16 mgKOH/g) obtained as a hydroxyl-type acrylic pressure-sensitive adhesive resin by copolymerization of EA, 2EHA, HEA, and AA in a mass ratio of 37.85:60:0.1:2.05 was added to YMF-02A (a CWO dispersion with a solid content of 28.5% manufactured by Sumitomo Metal Mining Co., Ltd.). After the materials were sufficiently stirred and mixed, a carboxyl-type acrylic pressure-sensitive adhesive resin (SK2094 (trade name) manufactured by Soken Chemical & Engineering Co., Ltd. (acrylic pressure-sensitive adhesive resin with an acid value of 6.8)) was added to the mixture and stirred.

The hydroxyl-type acrylic pressure-sensitive adhesive resin, the carboxyl-type acrylic pressure-sensitive adhesive resin, and the CWO dispersion were mixed in a ratio of 50:50:10 (solid to solid ratio). Near-infrared shielding film 125 was further prepared using the same procedure as in the preparation of near-infrared shielding film 101, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 126]

An acrylate copolymer (weight average molecular weight 650,000, acid value less than 0.5 mgKOH/g, hydroxy value 16 mgKOH/g) obtained as a hydroxyl-type acrylic pressure-sensitive adhesive resin by copolymerization of EA, 2EHA, HEA, and AA in a mass ratio of 37.85:60:0.1:2.05 was added to YMF-02A (a CWO dispersion with a solid content of 28.5% manufactured by Sumitomo Metal Mining Co., Ltd.). After the materials were sufficiently stirred and mixed, an acrylate copolymer (weight average molecular weight 550,000, acid value 55 mgKOH/g) obtained as a carboxyl-type acrylic pressure-sensitive adhesive resin by copolymerization of EA, BA, and AA in a mass ratio of 32.94:60:7.06 was added to the mixture and stirred.

The hydroxyl-type acrylic pressure-sensitive adhesive resin, the carboxyl-type acrylic pressure-sensitive adhesive resin, and the CWO dispersion were mixed in a ratio of 50:50:10 (solid to solid ratio). Near-infrared shielding film 126 was further prepared using the same procedure as in the preparation of near-infrared shielding film 101, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 127]

An acrylate copolymer (weight average molecular weight 650,000, acid value less than 0.5 mgKOH/g, hydroxy value 9 mgKOH/g) obtained as a hydroxyl-type acrylic pressure-sensitive adhesive resin by copolymerization of EA, 2EHA, HEA, and AA in a mass ratio of 37.85:60:0.1:2.05 was added to YMF-02A (a CWO dispersion with a solid content of 28.5% manufactured by Sumitomo Metal Mining Co., Ltd.). After the materials were sufficiently stirred and mixed, an acrylate copolymer (weight average molecular weight 700,000, acid value 8 mgKOH/g, hydroxy value 10 mgKOH/g) obtained as a hydroxyl/carboxyl-type acrylic pressure-sensitive adhesive resin by copolymerization of EA, 2EHA, 2HEA, and AA in a mass ratio of 37.07:60:1.65:1.28 was added to the mixture and stirred.

The hydroxyl-type acrylic pressure-sensitive adhesive resin, the hydroxyl/carboxyl-type acrylic pressure-sensitive adhesive resin, and the CWO dispersion were mixed in a ratio of 50:50:10 (solid to solid ratio). Near-infrared shielding film 127 was further prepared using the same procedure as in the preparation of near-infrared shielding film 101, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 128]

A hydroxyl-type acrylic pressure-sensitive adhesive resin (6LQ-002 manufactured by Taisei Fine Chemical Co., Ltd., solid content 51.0%, acid value less than 0.5 mgKOH/g, hydroxy value 16 mgKOH/g) was added to YMF-02A (a CWO dispersion with a solid content of 28.5% manufactured by Sumitomo Metal Mining Co., Ltd.). After the materials were sufficiently stirred and mixed, an acrylate copolymer (weight average molecular weight 700,000, acid value 8 mgKOH/g, hydroxy value 10 mgKOH/g) obtained as a hydroxyl/carboxyl-type acrylic pressure-sensitive adhesive resin by copolymerization of EA, 2EHA, 2HEA, and AA in a mass ratio of 37.07:60:1.65:1.28 was added to the mixture and stirred.

The hydroxyl-type acrylic pressure-sensitive adhesive resin, the hydroxyl/carboxyl-type acrylic pressure-sensitive adhesive resin, and the CWO dispersion were mixed in a ratio of 50:50:10 (solid to solid ratio). Near-infrared shielding film 128 was further prepared using the same procedure as in the preparation of near-infrared shielding film 101, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 129]

A near-infrared shielding film with the structure illustrated in FIG. 2 was prepared by the procedure described below.

[Formation of Near-infrared Reflecting Layer]

A 25-μm-thick polyethylene terephthalate film (COSMOSHINE A4300 manufactured by TOYOBO CO., LTD., with both sides having undergone adhesion facilitating treatment, abbreviated as PET) was used as a support. Using a slide hopper coater (slide coater) capable of performing multilayer coating, low refractive index layer-forming coating liquid L1 shown below and high refractive index layer-forming coating liquid H1 shown below were applied to the support being heated at 45° C., while coating liquids L1 and L2 were kept at 45° C. Coating liquids L1 and H1 were applied to the support by simultaneous multilayer coating in such a manner that high and low refractive index layers (17 layers in total including 9 low refractive index layers and 8 high refractive index layers) could be alternately stacked each with a dry thickness of 130 nm.

Immediately after the application, the coating was set by blowing 5° C. cold air for 5 minutes. Subsequently, the coating was dried by blowing 80° C. hot air to give a near-infrared reflecting layer composed of 17 layers.

[Preparation of Low Refractive Index Layer-forming Coating Liquid L1]

First, 680 parts of an aqueous solution of colloidal silica (SNOWTEX (registered trademark) OXS manufactured by Nissan Chemical Industries, Ltd.) as 10 mass % of second metal oxide particles, 30 parts of an aqueous solution of 40 mass % polyvinyl alcohol (PVA-103 manufactured by KURARAY CO., LTD., polymerization degree 300, saponification degree 98.5 mol %), and 150 parts of an aqueous solution of 3.0 mass % boric acid were mixed and dispersed. Colloidal silica dispersion L1 was prepared in a total amount of 1,000 parts by adding pure water to the resulting mixture.

Subsequently, resulting colloidal silica dispersion L1 was heated to 45° C., to which 760 parts of an aqueous solution of polyvinyl alcohol (JP-45 manufactured by JAPAN VAM & POVAL CO., LTD., polymerization degree 4,500, saponification degree 86.5 to 89.5 mol %) as 4.0 mass % of polyvinyl alcohol (B) was sequentially added with stirring. Subsequently, 40 parts of an aqueous solution of 1 mass % betaine surfactant (Softazoline (registered trademark) LSB-R, manufactured by Kawaken Fine Chemicals Co., Ltd.) was added to the mixture to form low refractive index layer-forming coating liquid L1.

[Preparation of High Refractive Index Layer-forming Coating Liquid H1]

(Preparation of Rutile-type Titanium Dioxide for Forming Core of Core-shell Particles)

Titanium oxide hydrate was suspended in water so that an aqueous suspension of titanium oxide was prepared at a $TiO_2$ equivalent concentration of 100 g/L. With stirring, 30 L (liters) of an aqueous sodium hydroxide solution (concentration 10 mol/L) was added to 10 L of the suspension. Subsequently, the mixture was heated to 90° C. and aged for 5 hours. Subsequently, the mixture was neutralized with hydrochloric acid. The neutralized mixture was filtrated and then washed with water.

The titanium oxide hydrate used as a raw material in this reaction (treatment) was a product obtained by subjecting an aqueous titanium sulfate solution to thermal hydrolysis according to a known technique.

The base-treated titanium compound was suspended in pure water in such a manner that a $TiO_2$ equivalent concentration of 20 g/L was reached. With stirring, 0.4 mol % of citric acid was added to the suspension based on the amount of $TiO_2$. The mixture was then heated. When the temperature of the resulting sol mixture reached 95° C., concentrated hydrochloric acid was so added that a hydrochloric acid concentration of 30 g/L was reached. The mixture was then stirred for 3 hours while the liquid temperature was maintained at 95° C., so that a titanium oxide sol was obtained.

The pH and zeta potential of the titanium oxide sol obtained as described above were measured to be 1.4 and +40 my, respectively. As a result of particle size measurement with Zeta Sizer Nano manufactured by Malvern instruments Ltd., the monodispersity was 16%.

The titanium oxide sol was further dried at 105° C. for 3 hours to give titanium oxide fine particles. The fine particles were identified as rutile type titanium oxide by X-ray diffraction measurement using JDX-3530 manufactured by JEOL DATUM Ltd. The fine particles also had a volume average particle size of 10 nm.

An aqueous 20.0 mass % titanium oxide sol dispersion containing the resulting rutile-type titanium oxide fine particles with a volume average particle size of 10 nm was added to 4 kg of pure water to form a sol for forming core particles.

(Preparation of Core-shell Particles by Shell Coating)

To 2 kg of pure water was added 0.5 kg of the aqueous 10.0 mass % titanium oxide sol dispersion, and the mixture was heated to 90° C. Subsequently, 1.3 kg of an aqueous silicic acid solution, which was prepared at a $SiO_2$ equivalent concentration of 2.0 mass %, was gradually added to the mixture. The resulting mixture was heat-treated in an autoclave at 175° C. for 18 hours and then further concentrated, so that a sol (solid concentration 20% by mass) of core-shell particles (average particle size 10 nm) was obtained, in which the core particles were made of titanium oxide with a rutile structure and the shell layer was made of $SiO_2$.

(Preparation of High Refractive Index Layer-forming Coating Liquid H1)

Core-shell particle dispersion H1 was prepared by mixing 28.9 parts of the sol obtained as described above having a solid concentration of 20.0 mass % and containing the core-shell particles as the first metal oxide particles, 10.5 parts of an aqueous solution of 1.92 mass % citric acid, 2.0 parts of an aqueous solution of 10 mass % polyvinyl alcohol (PVA-103, manufactured by KURARAY CO., LTD., polymerization degree 300, saponification degree 98.5 mol %), and 9.0 parts of an aqueous solution of 3 mass % boric acid.

Subsequently, 16.3 parts of pure water and 33.5 parts of an aqueous solution of 5.0 mass % polyvinyl alcohol (PVA-124, manufactured by KURARAY CO., LTD., polymerization degree 2,400, saponification degree 98 to 99 mol %) as polyvinyl alcohol (A) were added to core-shell particle dispersion H1 being stirred. Moreover, 0.5 parts of an aqueous solution of 1 mass % betaine surfactant (Softazoline (registered trademark) LSB-R, manufactured by Kawaken Fine Chemicals Co., Ltd.) was added to the mixture. Water was then added to the mixture to form high refractive index layer-forming coating liquid H1 in a total amount of 1,000 parts.

(Formation of Hard Coat Layer)

A 25-μm-thick polyethylene terephthalate film (COSMOSHINE A4300 manufactured by TOYOBO CO., LTD., with both sides having undergone adhesion facilitating treatment, abbreviated as PET) was used as a transparent substrate.

Using a gravure coater, UV-3701 (manufactured by TOAGOSEI CO., LTD.) was applied to the transparent substrate and then dried at a temperature of 90° C. Using a high-pressure mercury lamp, the coating layer was then cured at a total dose of 300 mJ/cm$^2$ to form a hard coat layer with a dry thickness of 2 μm.

Subsequently, using a die coater, pressure-sensitive adhesive layer-forming coating liquid 1, which was prepared for forming the near-infrared shielding film 101, was applied to the surface of the PET film opposite to its surface on which the hard coat layer was formed. After the coating was dried at 80° C. for 1 minute, the surface of the resulting pressure-sensitive adhesive layer was bonded to the surface of the PET film opposite its surface on which the infrared reflecting layer was formed.

(Formation of Pressure-sensitive Adhesive Layer 2)

Moreover, pressure-sensitive adhesive layer-forming coating liquid 2 was obtained by mixing an acrylic pressure-sensitive adhesive resin COPONYL N-2147 (manufactured by The Nippon Synthetic Chemical Industry Co., Ltd., solid content 35%), CORONATE FIX as a curing agent, and TINUVIN 477. The acrylic pressure-sensitive adhesive resin, the UV absorber, and the curing agent were mixed in a ratio of 100:5:0.16 (solid to solid ratio).

Subsequently, using a die coater, pressure-sensitive adhesive layer-forming coating liquid 2 prepared as described above was applied to the release-treated surface of a separator (NS-23MA manufactured by Nakamoto Packs Co., Ltd.) and then dried at 80° C. for 1 minute. The surface of the resulting pressure-sensitive adhesive layer was then bonded to the surface of the infrared reflecting layer, so that near-infrared shielding film 129 was obtained. The resulting pressure-sensitive adhesive layer had a thickness of 10 µm.

[Preparation of Near-infrared Shielding Film 130]

An alternative to pressure-sensitive adhesive layer-forming coating liquid 1 for near-infrared shielding film 129 was prepared as described below. A hydroxyl-type acrylic pressure-sensitive adhesive resin (6LQ-002 manufactured by Taisei Fine Chemical Co., Ltd., solid content 51.0%, acid value less than 0.5 mgKOH/g, hydroxy value 9 mgKOH/g) was added to YMF-02A (a CWO dispersion with a solid content of 28.5% manufactured by Sumitomo Metal Mining Co., Ltd.). After the materials were sufficiently stirred and mixed, a carboxyl-type acrylic pressure-sensitive adhesive resin (SK2094 (trade name) manufactured by Soken Chemical & Engineering Co., Ltd. (acrylic pressure-sensitive adhesive resin with an acid value of 6.8)) was added to the mixture and stirred.

The hydroxyl-type acrylic pressure-sensitive adhesive resin, the carboxyl-type acrylic pressure-sensitive adhesive resin, and the CWO dispersion were mixed in a ratio of 50:50:10 (solid to solid ratio). Near-infrared shielding film 130 was further prepared using the same procedure as in the preparation of near-infrared shielding film 129, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 131]

An alternative to pressure-sensitive adhesive layer-forming coating liquid 1 for near-infrared shielding film 129 was prepared as described below. An acrylate copolymer (weight average molecular weight 650,000, acid value less than 0.5 mgKOH/g, hydroxy value 16 mgKOH/g) obtained as a hydroxyl-type acrylic pressure-sensitive adhesive resin by copolymerization of EA, 2EHA, HEA, and AA in a mass ratio of 37.85:60:0.1:2.05 was added to YMF-02A (a CWO dispersion with a solid content of 28.5% manufactured by Sumitomo Metal Mining Co., Ltd.). After the materials were sufficiently stirred and mixed, a carboxyl-type acrylic pressure-sensitive adhesive resin (SK2094 (trade name) manufactured by Soken Chemical & Engineering Co., Ltd. (acrylic pressure-sensitive adhesive resin with an acid value of 6.8)) was added to the mixture and stirred.

The hydroxyl-type acrylic pressure-sensitive adhesive resin, the carboxyl-type acrylic pressure-sensitive adhesive resin, and the CWO dispersion were mixed in a ratio of 50:50:10 (solid to solid ratio). Near-infrared shielding film 131 was further prepared using the same procedure as in the preparation of near-infrared shielding film 129, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 132]

An alternative to pressure-sensitive adhesive layer-forming coating liquid 1 for near-infrared shielding film 129 was prepared as described below. An acrylate copolymer (weight average molecular weight 650,000, acid value less than 0.5 mgKOH/g, hydroxy value 16 mgKOH/g) obtained as a hydroxyl-type acrylic pressure-sensitive adhesive resin by copolymerization of EA, 2EHA, HEA, and AA in a mass ratio of 37.85:60:0.1:2.05 was added to YMF-02A (a CWO dispersion with a solid content of 28.5% manufactured by Sumitomo Metal Mining Co., Ltd.). After the materials were sufficiently stirred and mixed, an acrylate copolymer (weight average molecular weight 550,000, acid value 55 mgKOH/g) obtained as a carboxyl-type acrylic pressure-sensitive adhesive resin by copolymerization of EA, BA, and AA in a mass ratio of 32.94:60:7.06 was added to the mixture and stirred.

The hydroxyl-type acrylic pressure-sensitive adhesive resin, the carboxyl-type acrylic pressure-sensitive adhesive resin, and the CWO dispersion were mixed in a ratio of 50:50:10 (solid to solid ratio). Near-infrared shielding film 132 was further prepared using the same procedure as in the preparation of near-infrared shielding film 129, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 133]

An alternative to pressure-sensitive adhesive layer-forming coating liquid 1 for near-infrared shielding film 129 was prepared as described below. An acrylate copolymer (weight average molecular weight 650,000, acid value less than 0.5 mgKOH/g, hydroxy value 9 mgKOH/g) obtained as a hydroxyl-type acrylic pressure-sensitive adhesive resin by copolymerization of EA, 2EHA, HEA, and AA in a mass ratio of 37.85:60:0.1:2.05 was added to YMF-02A (a CWO dispersion with a solid content of 28.5% manufactured by Sumitomo Metal Mining Co., Ltd.). After the materials were sufficiently stirred and mixed, an acrylate copolymer (weight average molecular weight 700,000, acid value 8 mgKOH/g, hydroxy value 10 mgKOH/g) obtained as a hydroxyl/carboxyl-type acrylic pressure-sensitive adhesive resin by copolymerization of EA, 2EHA, 2HEA, and AA in a mass ratio of 37.07:60:1.65:1.28 was added to the mixture and stirred.

The hydroxyl-type acrylic pressure-sensitive adhesive resin, the hydroxyl/carboxyl-type acrylic pressure-sensitive adhesive resin, and the CWO dispersion were mixed in a ratio of 50:50:10 (solid to solid ratio). Near-infrared shielding film 133 was further prepared using the same procedure as in the preparation of near-infrared shielding film 129, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

[Preparation of Near-infrared Shielding Film 134]

An alternative to pressure-sensitive adhesive layer-forming coating liquid 1 for near-infrared shielding film 129 was prepared as described below. An acrylate copolymer (weight average molecular weight 650,000, acid value less than 0.5 mgKOH/g, hydroxy value 9 mgKOH/g) obtained as a hydroxyl-type acrylic pressure-sensitive adhesive resin by copolymerization of EA, 2EHA, HEA, and AA in a mass ratio of 37.85:60:0.1:2.05 was added to YMF-02A (a CWO dispersion with a solid content of 28.5% manufactured by Sumitomo Metal Mining Co., Ltd.). After the materials were sufficiently stirred and mixed, an acrylate copolymer (weight average molecular weight 500,000, acid value 75 mgKOH/g) obtained as a carboxyl-type acrylic pressure-sensitive adhesive resin by copolymerization of EA, 2EHA, and AA in a mass ratio of 30.37:60:9.63 was added to the mixture and stirred.

The hydroxyl-type acrylic pressure-sensitive adhesive resin, the carboxyl-type acrylic pressure-sensitive adhesive resin, and the CWO dispersion were mixed in a ratio of 50:50:10 (solid to solid ratio). Near-infrared shielding film 134 was further prepared using the same procedure as in the preparation of near-infrared shielding film 129, except that the pressure-sensitive adhesive layer-forming coating liquid used was obtained by mixing the resulting mixture with TINUVIN 477 (solid content 80%) as a UV absorber manufactured by BASF and an isocyanate crosslinking agent (CORONATE HX manufactured by Nippon Polyurethane Industry Co., Ltd.) as a curing agent, in which the acrylic pressure-sensitive adhesive resins, the UV absorber, and the curing agent were mixed in a ratio of 100:5:0.16 (solid to solid ratio).

Prepared near-infrared reflecting films 124 to 134 and near-infrared reflecting films 101, 110, and 118 prepared in Example 1 were subjected to evaluation of the haze after the weathering test shown below in addition to the same evaluation as in Example 1. The evaluation results are shown in Table 2.

(5) Haze after Weathering Test

The haze of each sample was measured under the conditions shown above after the sample was exposed to an environment at 85° C. and 85% RH for 1,000 hours. Samples with a haze value of 1.2% or less are evaluated as superior.

TABLE 2

| Near-infrared shielding film No. | Resin A Acid value | Resin A Hydroxy value | Resin B Acid value | Resin C Acid value | Resin C Hydroxy value | Tungsten oxide fine particles or composite tungsten oxide fine particles D Solid ratio | Evaluations Haze (%) Initial | Evaluations Haze (%) 60° C.-SWOM 2000 hr | Evaluations Haze (%) 85° C.-90% RH 1000 hr | Evaluations Haze (%) 85° C.-85% RH 1000 hr | ΔE SWOM 2000 hr | Note |
|---|---|---|---|---|---|---|---|---|---|---|---|---|
| 101 | <0.5 | 9 | 6.8 | — | — | 10 | 0.5 | 0.6 | 0.9 | 5.6 | 1.6 | Invention |
| 124 | <0.5 | 9 | 6.8 | — | — | 10 | 0.5 | 0.6 | 0.9 | 1.2 | 0.9 | Invention |
| 125 | <0.5 | 16 | 6.8 | — | — | 10 | 0.6 | 0.6 | 0.6 | 1.1 | 0.9 | Invention |
| 126 | <0.5 | 16 | 55 | — | — | 10 | 0.6 | 0.9 | 0.9 | 1.4 | 1.0 | Invention |
| 127 | <0.5 | 9 | — | 8 | 10 | 10 | 0.5 | 0.7 | 0.9 | 1.0 | 0.9 | Invention |
| 128 | <0.5 | 16 | — | 8 | 10 | 10 | 0.6 | 0.6 | 0.7 | 0.9 | 0.9 | Invention |
| 110 | <0.5 | 9 | 75 | — | — | 10 | 1.2 | 14.2 | 29.0 | 36.0 | 3.9 | Comparative Example |
| 118 | 1 | 9 | — | 8 | 10 | 10 | 2.4 | 4.5 | 11.0 | 26.0 | 3.4 | Comparative Example |
| 129 | <0.5 | 9 | 6.8 | — | — | 10 | 0.8 | 0.9 | 1.2 | 3.6 | 1.2 | Invention |
| 130 | <0.5 | 9 | 6.8 | — | — | 10 | 0.8 | 0.9 | 1.2 | 1.2 | 1.2 | Invention |
| 131 | <0.5 | 16 | 6.8 | — | — | 10 | 0.9 | 1.0 | 1.0 | 1.2 | 1.2 | Invention |
| 132 | <0.5 | 16 | 55 | — | — | 10 | 0.8 | 1.1 | 1.2 | 1.2 | 1.2 | Invention |
| 133 | <0.5 | 9 | — | 8 | 10 | 10 | 0.9 | 0.9 | 1.0 | 1.2 | 1.2 | Invention |
| 134 | <0.5 | 9 | 75 | — | — | 10 | 1.5 | 14.5 | 29.3 | 36.3 | 4.2 | Comparative Example |

* Acid and hydroxy values are in units of mgKOH/g.

It has been found that the near-infrared shielding films according to the present invention can reproduce the properties shown in Example 1, are superior with respect to the initial haze, the haze after the light resistance test, and the haze after the weathering test, and also show less discoloration.

It has also been found that good results on the haze can be achieved even after a severer weathering test (exposure to an embodiment at 85° C. and 85% RH for 1,000 hours) when the method for producing the near-infrared shielding film includes dispersing the oxide fine particles D in the hydroxyl-type acrylic pressure-sensitive adhesive resin A and then adding the carboxyl-type resin B or the hydroxyl/carboxyl-type resin C to the dispersion, and therefore the method including such steps is a preferred production method.

INDUSTRIAL APPLICABILITY

The near-infrared shielding film of the present invention, which has low initial haze and resistance to haze increase in weathering tests, is suitable for use as a protective film or a heat shield film for components of displays such as image displays and touch panels and for window panes of buildings, cars, and trains.

REFERENCE SIGNS LIST

10 Near-infrared shielding film
11 Transparent substrate
12 Pressure-sensitive adhesive layer
13 Release layer (separator film)
14 Hard coat layer
15 Pressure-sensitive adhesive layer 2
U Reflecting layer unit
ML Reflecting layer group
$T_1$ to $T_n$ Reflecting layer

The invention claimed is:

1. A near-infrared shielding film comprising: a transparent substrate; and a component layer provided on at least one surface of the transparent substrate and comprising a resin A, at least one of a resin B or a resin C, and oxide fine particles D, wherein
the resin A is a resin having an acid value of less than 0.5 mgKOH/g and a hydroxy value of 5 to 60 mgKOH/g,
the resin B is a resin having an acid value of 1 to 60 mgKOH/g,
the resin C is a resin having an acid value of at least 1 mgKOH/g and a hydroxy value of 5 to 60 mgKOH/g, and
the oxide fine particles D are tungsten oxide fine particles or composite tungsten oxide fine particles.

2. The near-infrared shielding film according to claim 1, wherein the component layer is a pressure-sensitive adhesive layer.

3. The near-infrared shielding film according to claim 1, further comprising a near-infrared reflecting layer capable of reflecting at least 20% of light with wavelengths of 800 to 1,300 nm, the near-infrared reflecting layer being provided on at least one surface of the transparent substrate where the component layer is provided.

4. A method for producing the near-infrared shielding film according to claim 1, the method comprising dispersing and mixing the oxide fine particles D in the resin A and then adding at least one of the resin B or the resin C to the mixture.

5. A pressure-sensitive adhesive composition comprising a resin A, at least one of a resin B or a resin C, and oxide fine particles D, wherein
the resin A is a resin having an acid value of less than 0.5 mgKOH/g and a hydroxy value of 5 to 60 mgKOH/g,
the resin B is a resin having an acid value of 1 to 60 mgKOH/g,
the resin C is a resin having an acid value of at least 1 mgKOH/g and a hydroxy value of 5 to 60 mgKOH/g, and
the oxide fine particles D are tungsten oxide fine particles or composite tungsten oxide fine particles.

6. The near-infrared shielding film according to claim 2, further comprising a near-infrared reflecting layer capable of reflecting at least 20% of light with wavelengths of 800 to 1,300 nm, the near-infrared reflecting layer being provided on at least one surface of the transparent substrate where the component layer is provided.

7. A method for producing the near-infrared shielding film according to claim 2, the method comprising dispersing and mixing the oxide fine particles D in the resin A and then adding at least one of the resin B or the resin C to the mixture.

8. A method for producing the near-infrared shielding film according to claim 3, the method comprising dispersing and mixing the oxide fine particles D in the resin A and then adding at least one of the resin B or the resin C to the mixture.

* * * * *